US010223583B2

(12) United States Patent
Haraguchi et al.

(10) Patent No.: US 10,223,583 B2
(45) Date of Patent: Mar. 5, 2019

(54) OBJECT DETECTION APPARATUS

(71) Applicant: MegaChips Corporation, Osaka (JP)

(72) Inventors: Yuki Haraguchi, Osaka (JP); Hiromu Hasegawa, Osaka (JP)

(73) Assignee: MegaChips Corporation, Osaka (JP)

( * ) Notice: Subject to any disclaimer, the term of this patent is extended or adjusted under 35 U.S.C. 154(b) by 169 days.

(21) Appl. No.: 15/357,512

(22) Filed: Nov. 21, 2016

(65) Prior Publication Data

US 2017/0068852 A1 Mar. 9, 2017

Related U.S. Application Data

(62) Division of application No. 14/204,676, filed on Mar. 11, 2014, now Pat. No. 9,536,137.

(30) Foreign Application Priority Data

Mar. 26, 2013 (JP) .................................. 2013-064815
Mar. 26, 2013 (JP) .................................. 2013-064820

(51) Int. Cl.
*G06K 9/00* (2006.01)
*G06K 9/62* (2006.01)
(Continued)

(52) U.S. Cl.
CPC ..... *G06K 9/00362* (2013.01); *G06K 9/00805* (2013.01); *G06K 9/6267* (2013.01);
(Continued)

(58) Field of Classification Search
CPC ............ G06K 9/00362; G06K 9/6267; G06K 9/6857; G06K 9/00805; G06K 9/6288; B60R 11/04
See application file for complete search history.

(56) References Cited

U.S. PATENT DOCUMENTS 9,536,137 B2 * 1/2017 Haraguchi ......... G06K 9/00362
2005/0220336 A1 * 10/2005 Sabe .................. G06K 9/00248
382/159

(Continued)

FOREIGN PATENT DOCUMENTS

JP          10-302074       11/1998
JP          H11-195127 A    7/1999
(Continued)

OTHER PUBLICATIONS

Extended Search Report dated Apr. 19, 2017 in European Patent Application No. 14161267.1.
(Continued)

*Primary Examiner* — Aaron W Carter
(74) *Attorney, Agent, or Firm* — Xsensus LLP

(57) ABSTRACT

In an object detection apparatus 1, a window definer 11 defines a window relative to the location of a pixel in an input image 20. A classification value calculator 13 calculates a classification value indicative of the likelihood that a detection target is present in the window image contained in the window based on the feature data of the detection target. A classification image generator 14 arranges the classification value calculated from the window image according to the pixel location to generate a classification image. An integrator 15 integrates the classification image and a past classification image 42 generated from a past input image input prior to the input image 20 to generate an integrated image 45. A determiner 16 determines whether the detection target is present in the input image 20 based on the integrated image 45.

6 Claims, 16 Drawing Sheets

(51) Int. Cl.
*G06K 9/68* (2006.01)
*B60R 11/04* (2006.01)
(52) U.S. Cl.
CPC ......... *G06K 9/6288* (2013.01); *G06K 9/6857* (2013.01); *B60R 11/04* (2013.01)

(56) References Cited

U.S. PATENT DOCUMENTS

| | | | | |
|---|---|---|---|---|
| 2005/0273212 | A1* | 12/2005 | Hougen | G06K 9/00805 701/1 |
| 2008/0193020 | A1 | 8/2008 | Sibiryakov et al. | |
| 2008/0232698 | A1* | 9/2008 | Shi | G06K 9/00228 382/225 |
| 2009/0202145 | A1* | 8/2009 | Yokono | G06K 9/00362 382/160 |
| 2009/0226037 | A1 | 9/2009 | Yang | |
| 2010/0215254 | A1* | 8/2010 | Prokhorov | G06K 9/3241 382/159 |
| 2011/0135154 | A1 | 6/2011 | Wedge | |
| 2013/0070105 | A1 | 3/2013 | Ike | |
| 2013/0266226 | A1 | 10/2013 | Zhang | |
| 2014/0072170 | A1 | 3/2014 | Zhang | |
| 2014/0205141 | A1 | 7/2014 | Gao | |
| 2014/0219504 | A1* | 8/2014 | Haraguchi | G06K 9/00369 382/103 |
| 2014/0294309 | A1* | 10/2014 | Haraguchi | G06K 9/00362 382/224 |
| 2015/0161466 | A1 | 6/2015 | Welinder | |

FOREIGN PATENT DOCUMENTS

| | | |
|---|---|---|
| JP | 2005-354578 | 12/2005 |
| JP | 2008-530701 A | 8/2008 |
| JP | 2009-70344 | 4/2009 |
| JP | 2011-053951 A | 3/2011 |
| JP | 2011-118944 A | 6/2011 |
| JP | 2011-128916 A | 6/2011 |

OTHER PUBLICATIONS

Andreas Ess, et al., "Object Detection and Tracking for Autonomous Navigation in Dynamic Environments", International Journal of Robotics Research, vol. 29, No. 14, Dec. 2010, XP55170047, pp. 1707-1725.

Adrian Rosebrock: "Sliding Windows for Object Detection with Python and OpenCV", PyImageSearch, Navigation, 2015, XP055356947, 24 pages.

Office Action dated Mar. 14, 2017 in Japanese Patent Application No. 2013-064820 (with English translation).

Partial European Search Report dated Feb. 2, 2017 in Patent Application No. 14161267.1.

Amnon Shashua et al., "Pedestrian Detection for Driving Assistance Systems: Single-frame Classification and System Level Performance", Intelligent Vehicles Symposium, XP010727433, Jun. 14-17, 2004, pp. 1-6.

Max Bajracharya et al., "A Fast Stereo-based System for Detecting and Tracking Pedestrians from a Moving Vehicle", International Journal of Robotics Research, vol. 28, No. 11-12, XP055335256, Jul. 21, 2009, pp. 1466.

Alessandro Prest et al., "Explicit modeling of human-object interactions in realistic videos" HAL Technical Report RT-0411, XP055336011, Jan. 10, 2012, pp. 1-25 (with cover pages).

Official Action (with English translation) dated Nov. 1, 2016 in corresponding Japanese Application Serial No. 2013-064820.

* cited by examiner (64×128 PIXELS)

SCALE-UP
(BY A RATIO OF 125 %)

ROTATION
(CLOCKWISE BY 7 DEGREES)

OBJECT DETECTION APPARATUS

CROSS REFERENCE TO RELATED APPLICATIONS

The present application is a divisional application of and claims the benefit of priority under 35 U.S.C. § 120 to U.S. application Ser. No. 14/204,676, filed Mar. 11, 2014, the entire contents of which is hereby incorporated by reference and which is based upon and claims the benefit of priority under 35 U.S.C. § 119 to Japanese Patent Applications No. 2013-064820 and No. 2013-064815, both filed Mar. 26, 2013.

BACKGROUND OF THE INVENTION

Field of the Invention

The present invention relates to an object detection apparatus for determining whether a detection target is present in an image.

Description of the Background Art

Object detection apparatuses exist for determining whether a target, such as a person, is present in an image captured by a camera, for example. An object detection apparatus may be, together with a camera, mounted on a vehicle, for example. The object detection apparatus determines whether a person is present in an image captured by the camera to notify the driver of the presence of a pedestrian. As a result, the driver of the vehicle can easily recognize the situation outside the vehicle.

To determine whether a target is present in an image, the object detection system uses algorithms with learning functions such as neural networks, support vector machines, and pattern matching. The object detection apparatus defines an area in an input image in which an object is to be detected (referred to as "detection window"). The object detection apparatus uses a program incorporating one of the above algorithms to determine whether a target is present in the detection window.

For example, the image recognition apparatus of Patent Document 1 defines a plurality of detection windows that partially overlap, and uses a reference pattern of a target to be recognized (for example, a pedestrian) to perform pattern matching on each detection window. For a region for which pattern matching is performed more than once, the image recognition apparatus integrates the pattern matching results. Based on the results of integration, the image recognition apparatus identifies the location of the pedestrian.

Patent Document 2 describes a position detection apparatus for detecting the position of the license plate of an automobile based on an image, using a neural network. The position detection apparatus cuts out a small area from an original image captured by a camera and applies the neural network to this small area. The output values of the neural network are converted in scale to the size of the small area. The position detection apparatus multiplies the output values from scale conversion by a Gaussian window to generate, for each of small areas, a projected image that reflects the output values. Based on an image obtained by summing the projected images for the small areas, the position detection apparatus identifies the position of the license plate.

PATENT DOCUMENTS

Patent Document 1 JP 2009-70344 A
Patent Document 2 JP H10(1998)-302074 A

Thus, when a conventional object detection apparatus determines whether or not a target is present using an algorithm such as a neural network, the feature data of the target must be prepared in advance. For example, when the object detection apparatus is to detect a pedestrian in an image using a neural network, the apparatus "learns" sample images including those of pedestrians to create feature data. The apparatus learns sample images of pedestrians with different sexes, heights, positions, and proportions in an image are learned. Thus, the apparatus learns various sample images to improve the detection accuracy for pedestrians.

However, if the features of a pedestrian in an image are not consistent with the learned features of pedestrians, a conventional object detection apparatus cannot detect the pedestrian in the image. Further, if the features of an object that is not a pedestrian in an image happen to be consistent with the learned features of pedestrians, a conventional object detection apparatus falsely detects the object that is not a pedestrian as a pedestrian. Thus, however various sample images a conventional object detection apparatus learns, a false detection cannot be completely prevented.

SUMMARY OF THE INVENTION

An object detection apparatus of the present invention includes: a window defining unit configured to define a window relative to the location of a pixel in an input image, and extract the window from the input image to generate a window image; a classification value calculating unit configured to calculate a classification value indicative of the likelihood that a detection target is present in the window image based on the feature data of the detection target from the window image; a classification image generating unit configured to arrange the classification value calculated from the window image according to the pixel location to generate a classification image; an integrating unit configured to integrate the classification image and a first past classification image generated from a first past input image input prior to the input image to generate an integrated image; and a determining unit configured to determine whether the detection target is present in the input image based on the integrated image.

The detection accuracy for a detection target may be improved by using not only classification values from an input image but also classification value from a past input image.

An object detection apparatus of the present invention includes: a window defining unit configured to define a window in an input image, and extract the window from the input image to generate a normal window image; an image processing unit configured to perform a predetermined type of image processing on the normal window image to generate a modified window image; a classification value calculating unit configured to calculate, based on the feature data of a detection target, a normal classification value indicative of the likelihood that the detection target is present in the normal window image and a modified classification value indicative of the likelihood that the detection target is present in the modified window image; a classification image generating unit configured to generate, from the normal classification value, a normal classification image with the same size as the window and to generate, from the modified classification value, a modified classification image with the same size; an image reverse processing unit configured to perform, on the modified classification image, the type of image processing that is the reverse of the predetermined type of image processing to generate a reverse processed image; and an accumulating unit configured to accumulate the values of the pixels of normal classification images each obtained for one window and the values of the pixels of reverse processed images depending on the window location.

The detection accuracy for a detection target may be improved by using not only classification values obtained from a window image but also classification values obtained from an image generated by performing a predetermined type of image processing on the window image.

An object of the present invention is to provide an object detection apparatus capable of detecting a target in an image with improved accuracy.

These and other objects, features, aspects and advantages of the present invention will become more apparent from the following detailed description of the present invention when taken in conjunction with the accompanying drawings.

DESCRIPTION OF THE PREFERRED EMBODIMENTS

Now, embodiments of the present invention will be described in detail with reference to the drawings.

First Embodiment

[1. Configuration of Object Detection Apparatus 1]

Figure 1:
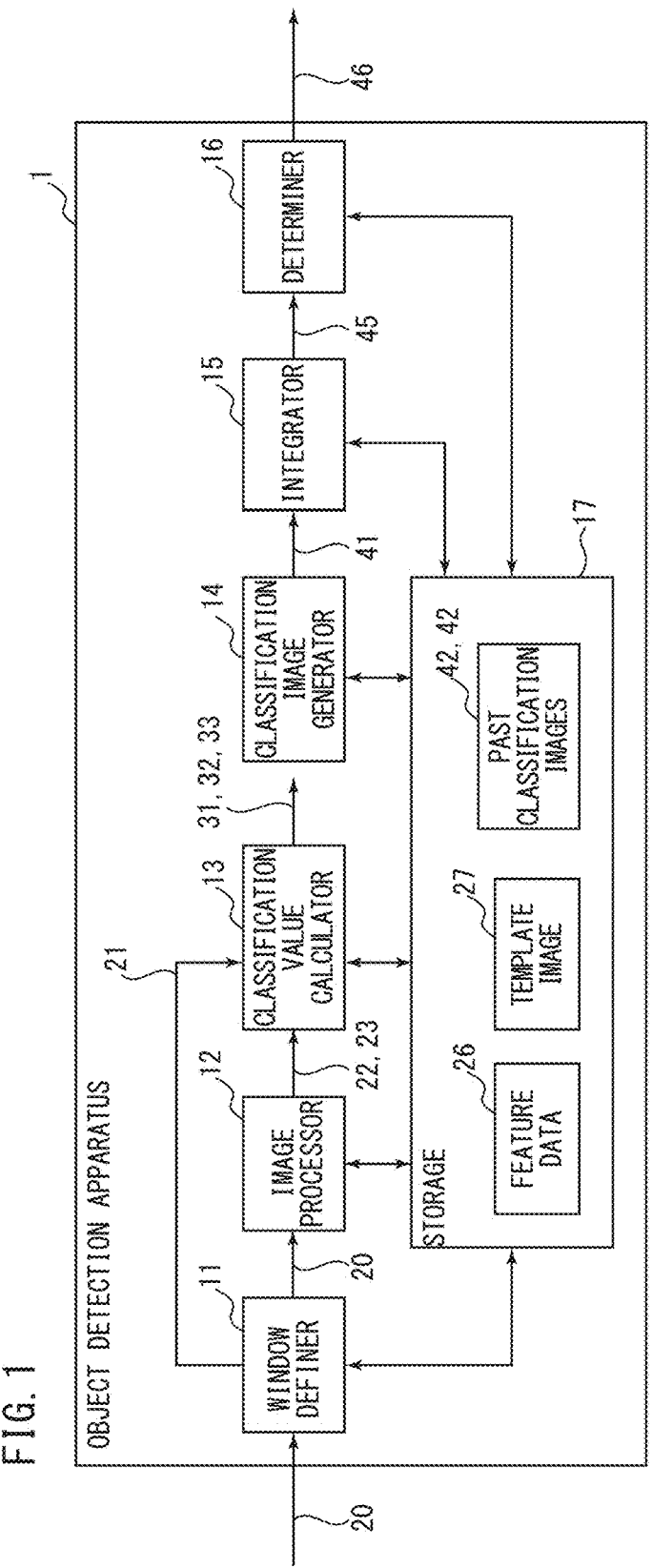
FIG. 1 is a functional block diagram of an object detection apparatus according to a first embodiment of the present invention.

FIG. 1 is a functional block diagram of an object detection apparatus 1 according to a first embodiment of the present invention. The object detection apparatus 1 determines whether a detection target is present in an image captured by a camera (not shown).

In the present embodiment, the object detection apparatus 1, together with a camera, is mounted on a vehicle. The camera takes pictures of a scene in front of the vehicle to generate moving image data. The object detection apparatus 1 successively receives frames constituting the moving image data. An input image 20 corresponds to one of these frames. Based on input images 20, the object detection apparatus 1 detects a pedestrian as a detection target.

As shown in FIG. 1, the object detection apparatus 1 includes a window definer 11, an image processor 12, a classification value calculator 13, a classification image generator 14, an integrator 15, a determiner 16, and a storage 17.

A window definer 11 defines a plurality of windows in the input image 20, scanning the entire input image 20. A window is a unit area used to determine whether a pedestrian is present in the input image 20. The window definer 11 cuts out the image contained in the defined window from the input image 20 to generate a normal window image 21.

The image processor 12 separately scales up and rotates the input image 20. Further, the image processor 12 cuts out a window of the scaled-up input image 20 and a window of the rotated input image 20 to generate a scaled-up window image 22 and a rotated window image 23. The scaled-up window image 22 and rotated window image 23 may also be collectively referred to as "modified window image". The modified window image will be described in detail further below.

Based on the feature data 26 stored in the storage 17, the classification value calculator 13 calculates a classification value 31 from the normal window image 21. A neural network is used to calculate the classification value 31. A classification value 31 indicates the likelihood that a pedestrian is present in the normal window image 21. A classification value 31 increases as the possibility of a pedestrian being present in the window image increases, and approaches zero as the possibility of a pedestrian being present decreases. Similarly, the calculator calculates a classification value 32 from the scaled-up window image 22, and a classification value 33 from the rotated window image 23.

The classification image generator 14 accumulates a set of classification values 31 to 33 for each window to produce an accumulated classification value, and uses accumulated classification values to generate a classification image 41. The classification image generator 14 arranges the accumulated classification values in a template image 27 according to the window location to generate a classification image 41. All the pixels of the template image 27 have a value of zero, and the template image has a size equal to that of the input image 20.

The integrator 15 integrates the classification image 41 and past classification images 42 to generate an integrated image 45. The past classification images 42 are generated from two input images (past input images) received prior to the input image 20. That is, the integrated image 45 is generated by integrating in time a current classification image and past classification images. The integrated image 45 is generated by summing the values of the pixels of the classification image 41 and the values of the pixels of the past classification images 42 according to the pixel location.

Based on the integrated image 45, the determiner 16 determines whether a pedestrian is present in the input image 20. When the determiner 16 determines that a pedestrian is present in the input image 20, it generates a detection result image 30 with a frame placed over the input image 20 for indicating the presence of the pedestrian.

The storage 17 may be a hard disc drive or flash memory, and may hold the feature data 26, template image 27 and past classification images 42. The feature data 26 represents the features of detection targets (pedestrians). The storage 17 may also be used as a work area used by the window definer 11, image processor 12, classification value calculator 13, classification image generator 14, integrator 15, and determiner 16 to perform various processes.

[2. Operation of Object Detection Apparatus 1]

[2.1. Outline of Operation]

Figure 2:
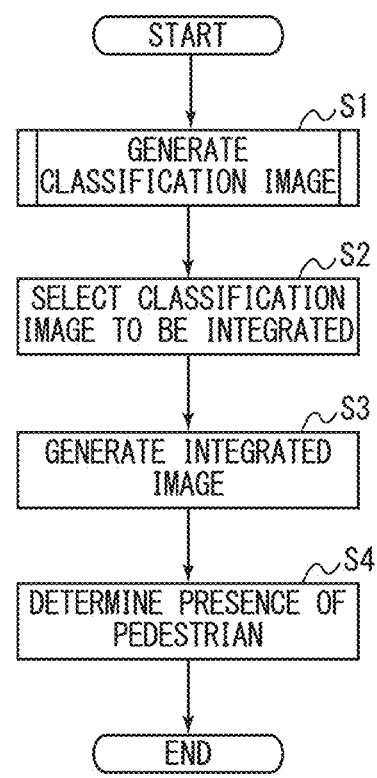
FIG. 2 is a flow chart illustrating the operation of the object detection apparatus shown in FIG. 1.

The FIG. 2 is a flow chart illustrating the operation of the object detection apparatus 1. The operation of the object detection apparatus 1 will be described with reference to FIG. 2.

Each time the object detection apparatus 1 receives an input image 20, it performs the process shown in FIG. 2 to determine whether a pedestrian is present in the input image 20.

The object detection apparatus 1 performs classification image generation (step S1). Thus, a classification image 41 is generated from the input image 20. The classification image generation (step S1) will be described in detail further below.

After the object detection apparatus 1 generates the classification image 41, it selects past classification images 42 to be integrated (step S2). More specifically, the apparatus selects the classification images generated from two past input images received immediately before the input image 20 to be integrated. One of the two past input images is referred to as a first past input image, which is received immediately before the input image 20, and the other is referred to as a second past input image, which is received immediately before the first past input image.

The object detection apparatus 1 integrates the classification image 41 and the past classification images 42 selected at step S2 to generate an integrated image 45 (step S3). If the object detection apparatus 1 fails to select two past classification images 42, it does not perform steps S3 and S4. Scenarios in which the apparatus fails to select two past classification images 42 will be described further below.

Based on the integrated image 45, the object detection apparatus 1 determines whether a pedestrian is present in the input image 20 (step S4). The object detection apparatus 1 identifies an area of the integrated image 45 that includes the pixels with values equal to or above a predetermined reference value, and determines whether the identified area is larger than a predetermined size. If the identified area is larger than the predetermined size, the object detection apparatus 1 determines that a pedestrian is present in the identified area.

Next, the steps shown in FIG. 2 will be described in detail.

[2.2. Classification Image Generation (Step S1)]

Figure 3:
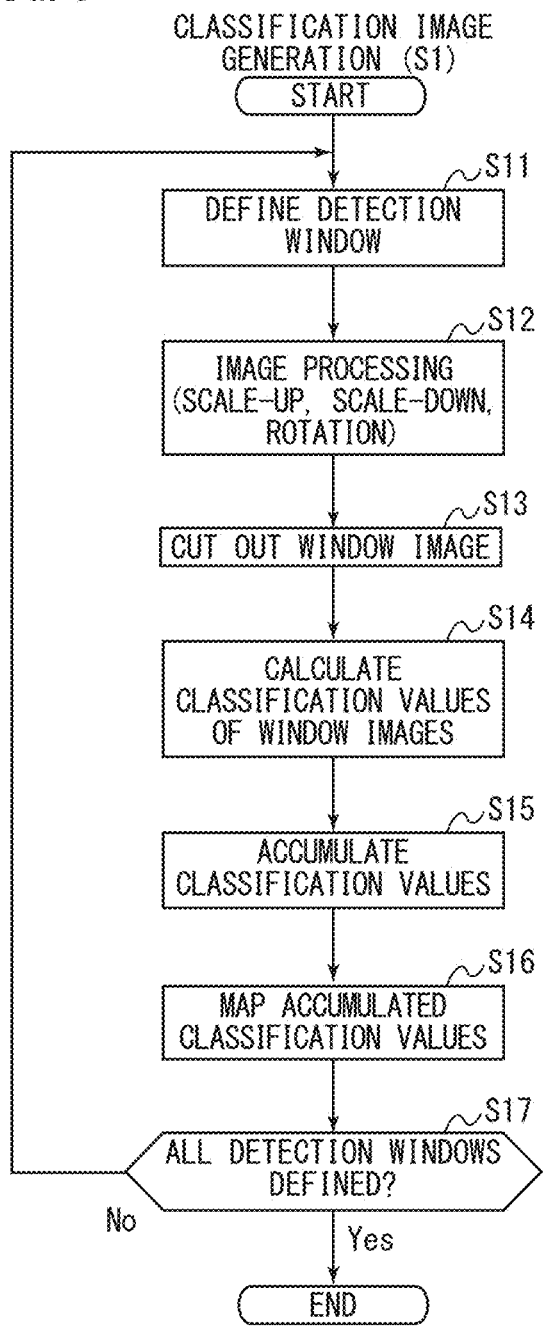
FIG. 3 is a flow chart of the classification image generation shown in FIG. 2.
Figure 4:
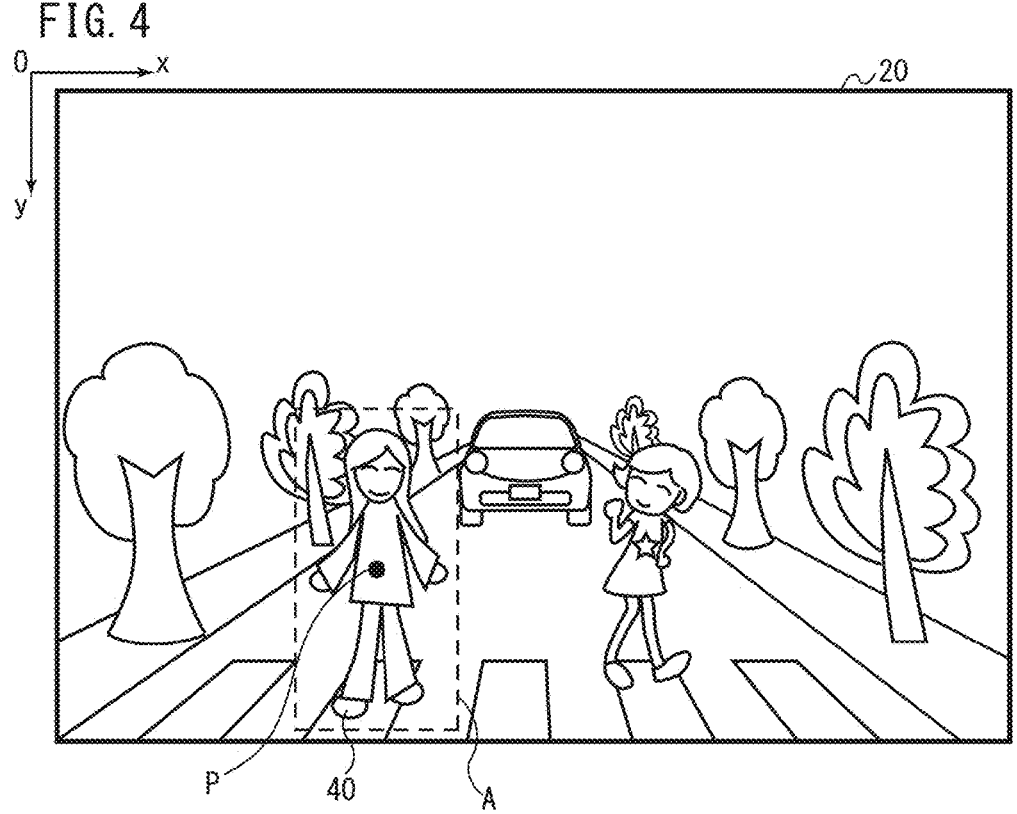
FIG. 4 illustrates an example of an image received by the object detection apparatus shown in FIG. 1.

FIG. 3 is a flow chart of the classification image generation (step S1). FIG. 4 illustrates an example of an input image 20. In the input image 20 shown in FIG. 4, the origin O is the top-left apex, the x-axis is the horizontal axis and the y-axis is the vertical axis. The classification image generation (step S1) will be described in detail with reference to FIGS. 3 and 4.

In accordance with a predetermined order, the window definer 11 defines one window in the input image 20 (step S11). The window definer 11 selects a central pixel, which serves as the center of the window, from the pixels of the input image 20, and defines a window based on the location of the selected central pixel.

As will be discussed below, step S11 is repeated such that the definer determines central pixels in such a way that the input image 20 is scanned beginning with the top-left apex and ending with the bottom-right apex. The window definer 11 may successively designate each pixel of the input image 20 as a central pixel. Alternatively, any two adjacent central pixels selected by the window definer 11 may be spaced apart by a certain distance. For example, any two adjacent central pixels selected by the definer may be spaced apart by five pixels regardless of scanning direction (i.e. horizontal or vertical).

Next, the classification image generation (step S1) will be described in detail with reference to an example where the window A shown in FIG. 4 is defined at step S11, unless specifically indicated otherwise. A person 40 is present in the window A.

The image processor 12 scales up the input image 20, and, separately, rotates the input image (step S12). The input image is scaled up or rotated with respect to the center P of the window A. The input image 20 is scaled up relative to the center P by a ratio of 125%. The input image 20 is rotated with respect to the center P 7 degrees clockwise. The results are a scaled-up input image 20 and a rotated input image 20. At step S12, the coordinates that determine the window A remain unchanged. That is, the window A itself is not scaled up, nor is it rotated.

Figure 5:
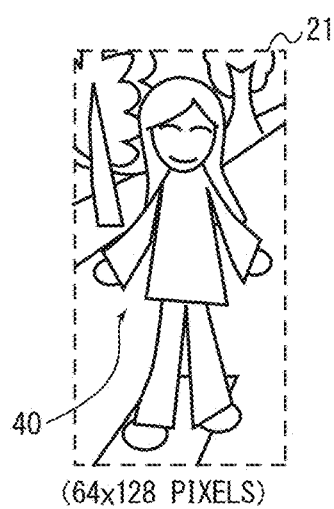
FIG. 5 illustrates a normal window image generated by the object detection apparatus shown in FIG. 1.
Figure 6:
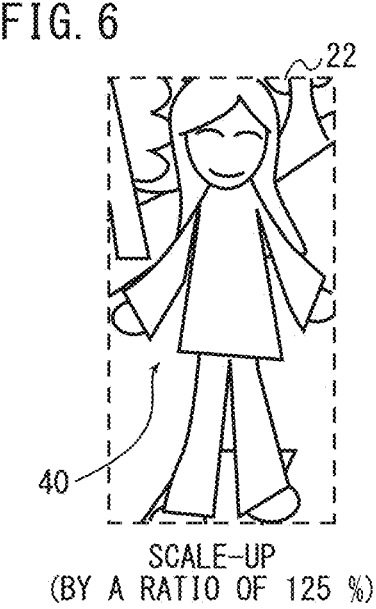
FIG. 6 illustrates a scaled-up window image generated by the object detection apparatus shown in FIG. 1.
Figure 7:
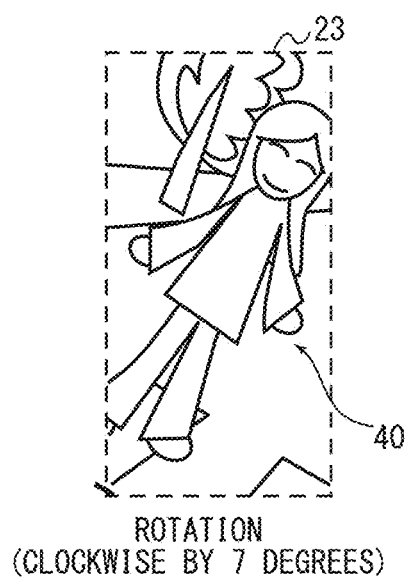
FIG. 7 illustrates a rotated window image generated by the object detection apparatus shown in FIG. 1.

The object detection apparatus 1 performs cutting-out on the input image 20 and the processed input images 20 (step S13). As shown in FIG. 5, the window definer 11 cuts out the image contained in the window A from the input image 20 to generate a normal window image 21. As shown in FIG. 6, the image processor 12 cuts out the image contained in the window A from the scaled-up input image 20 to generate a scaled-up window image 22. As shown in FIG. 7, the image processor 12 cuts out the image contained in the window A from the rotated input image 20 to generate a rotated window image 23.

Desirably, at steps S12 and S13, the image processor 12 processes the image in the window A and its surrounding area, and cuts out a modified window image from the image in the processed area. This will reduce computation and also prevent a blank area from being produced in the modified window image.

It should be noted that steps S12 and S13 may be switched in order. More specifically, the window definer 11 cuts out a normal window image 21 from an input image 20 (step S13). Thereafter, the image processor 12 separately scales up and rotates the normal window image 21 (step S12). As a rotated window image 23 is generated from the normal window image 21, the rotated window image 23 has a blank area. Then, the image processor 12 may set the pixels in the blank area to the value of zero. Alternatively, the image processor 12 may copy the values of the pixels of the area other than the blank area into the pixels in the blank area. For example, it is assumed that the origin is the top-left apex of the rotated window image 23 and the pixels to the left of the coordinates (x,y) in the rotated window image 23 have no value. In this case, the image processor 12 may copy the value of the pixel of the coordinates (x,y) into the pixels of the coordinates (0,y) to (x−1,y).

Based on the feature data 26, the classification value calculator 13 calculates classification values 31 to 33 for the normal window image 21 and modified window images (step S14). The classification values 31 to 33 may be calculated using, other than a neural network, various algorithms such as pattern matching and a support vector machine.

If, for example, the normal window image 21 has a size of 64 horizontal pixels and 128 vertical pixels, the classification value calculator 13 scales down the normal window image 21 to the size of 16 horizontal pixels and 32 vertical pixels. The classification value calculator 13 calculates the classification value 31 using the scaled-down normal window image 21. Scaling down the normal window image 21 will reduce computation by the neural network. The classification values 32 and 33 for the modified window images are calculated in a similar manner. Alternatively, the classification values may be calculated without changing the sizes of the window images.

The classification image generator 14 accumulates the classification values 31 to 33 (step S15). The resulting value (accumulated classification value) is mapped to the template image 27 (step S16). For example, if each pixel of the input image 20 is selected as the central pixel of a window, the pixel at the location in the template image 27 corresponding to the location of each central pixel is set to an accumulated classification value.

If a window central pixel is selected from every five horizontal or vertical pixels, the classification image generator 14 sets to an accumulated classification value the pixels in an area of 5 horizontal pixels and 5 vertical pixels relative to the central pixel. More specifically, if the center P of a window A is at the coordinates (x,y), the pixels in a rectangle with its top-left apex at the coordinates (x−2,y−2) and its top-right apex at the coordinates (x+2,y+2) are set to an accumulated classification value.

The object detection apparatus 1 determines whether all the windows for the input image 20 have been defined (step S17). If not all the windows have been defined (No at step S17), the object detection apparatus 1 repeats steps S11 to S16. As a result, the accumulated classification values calculated from each window are mapped to the template image 27 to generate a classification image 41. If all the windows have been defined (Yes at step S17), the object detection apparatus 1 completes the classification image generation (step S1).

Thus, to improve the detection accuracy for a pedestrian, the object detection apparatus 1 generates, other than a normal window image 21, one or more modified window images that will be used by the classification value calculator 13 for calculation. The classification value calculator 13 may not generate from a normal window image 21 a classification value 31 indicative of the possibility of the presence of a person due to noise or the like even if a pedestrian is imaged in the normal window image 21. Still, if the features of a pedestrian imaged in one of the modified window images are consistent with the features registered in the feature data 26, the classification value calculator 13 is capable of providing a classification value indicative of the presence of a pedestrian. The object detection apparatus 1 improves the detection accuracy for a person by summing the classification values 31 to 33.

However, a false detection may occur even when the presence of a pedestrian is determined based on a classification image 41 generated by summing the classification values 31 to 33.

Figure 8:
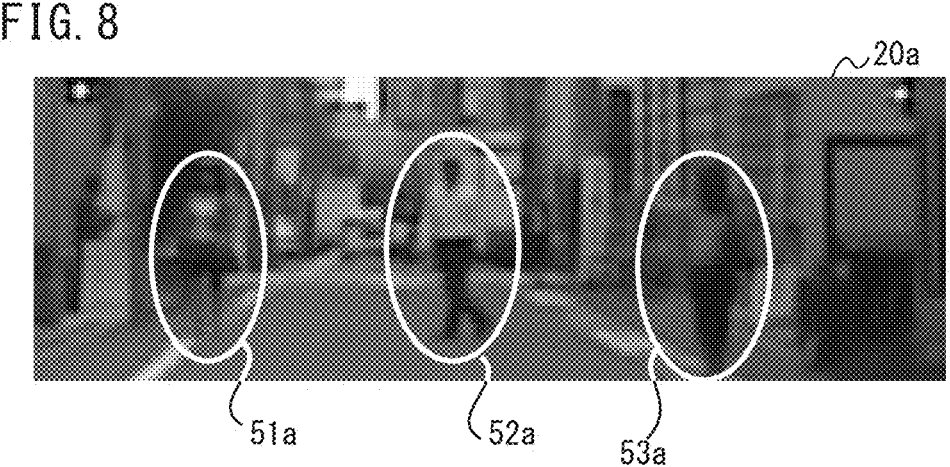
FIG. 8 illustrates another example of an image received by the object detection apparatus shown in FIG. 1.
Figure 9:
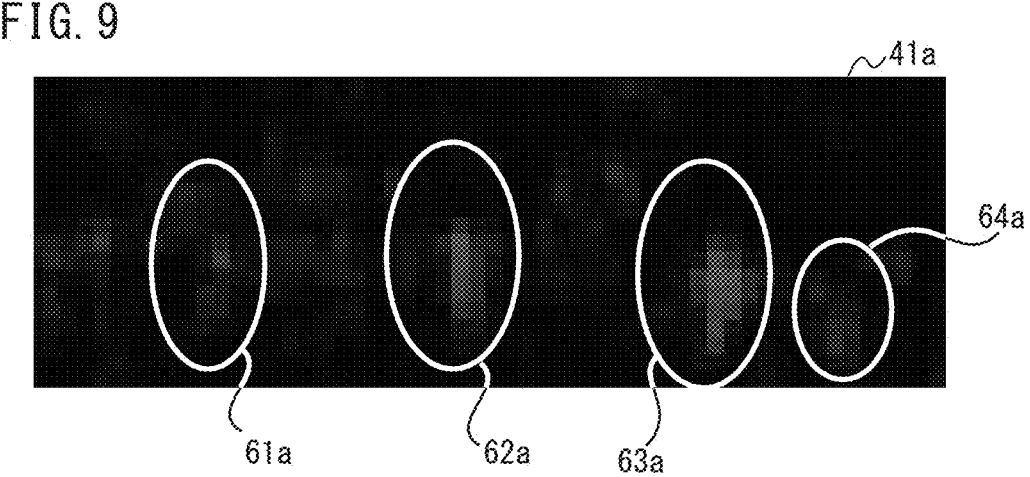
FIG. 9 illustrates a classification image generated from the image shown in FIG. 8.

FIG. 8 illustrates another example of an input image 20 (input image 20a). FIG. 9 illustrates a classification image 41a generated from the input image 20a of FIG. 8. In the classification image 41a, as a pixel becomes darker, its value approaches zero; as a pixel becomes brighter, its value becomes larger. That is, as a pixel becomes brighter, the possibility of the presence of a pedestrian at the location of that pixel increases. It should be noted that in the input image 20a, the window central pixels are spaced apart such that the classification image 41a is coarser than the input image 20a.

In the input image 20a of FIG. 8, a pedestrian is present in each of the areas 51a to 53a, defined by white lines. In the classification image 41a of FIG. 9, the areas 61a to 63a correspond to the areas 51a to 53a, and it can be understood that the pixels in these areas include white ones. Thus, the presence of a pedestrian in the input image 20a can be determined using the classification image 41a.

However, the pixels in the area 64a located to the right of the area 63a in the classification image 41a include white ones even though no pedestrian is present to the right of the area 53a in the input image 20a. This means that the classification value calculator 13 has output a classification value indicative of the presence of a pedestrian based on a window image indicating an object that is not a pedestrian. Thus, a false detection occurs if the presence of a pedestrian in the input image 20a is determined based on only a classification image 41a. The object detection apparatus 1 prevents a false detection by integrating a classification image 41 and past classification images 42. This will be described in detail below.

[2.3. Generation of Integrated Image 45 and Pedestrian Detection (Steps S3 and S4)]

Figure 10:
FIG. 10 illustrates classification images and integrated images generated by the object detection apparatus shown in FIG. 1, arranged in a temporal sequence.

FIG. 10 illustrates input images 20, classification images 41 and integrated images 45 arranged in a temporal sequence. The generation of integrated images 45 will be described with reference to FIG. 10. It is assumed that, as shown in FIG. 10, the object detection apparatus 1 successively receives input images 20a to 20d.

In the classification images 41a to 41d and integrated images 45c and 45d shown in FIG. 10, similar to FIG. 9, pixels with larger values are brighter, and pixels with values closer to zero are darker. It should be noted that the integrated images 45c and 45d shown in FIG. 10 are generated without rounding-down and weighting, discussed further below.

First, the object detection apparatus 1 receives the input images 20a. The classification image generation (step S1) generates the classification image 41a corresponding to the input image 20a. Since the input image 20a is the first image to be received by the object detection apparatus 1, no past classification image 42 to be integrated is present. Thus, the object detection apparatus 1 ends the process of FIG. 2 without performing steps S2 to S4, and waits until it receives an input image 20b.

When the object detection apparatus 1 receives the input image 20b, which follows the input image 20a, it generates a classification image 41b corresponding to the input image 20b (step S1). Since the input image 20a is the only past input image immediately before the input image 20b, the integrator 15 cannot select two past classification images 42 to be integrated. The object detection apparatus 1 ends the process of FIG. 2 without performing steps S2 to S4 and waits until it receives an input image 20c.

If the object detection apparatus 1 receives the input image 20c, which follows the input image 20b, it generates a classification image 41c corresponding to the input image 20c (step S1). Since the apparatus has received two past input images (input images 20a and 20b) immediately before the input image 20c, the integrator 15 selects the classification images 41a and 41b corresponding to the input images 20a and 20b to be integrated (past classification images).

The integrator 15 integrates the classification images 41a to 41c to generate an integrated image 45c (step S3). As discussed above, the values of the pixels of the classification images 41a to 41c are obtained by accumulating classification values as described above. As such, an area with pixels with large values in the integrated image 45 (i.e. a white area) indicates a high possibility that a pedestrian is present.

Now that the integrated image 45c has been generated, the determiner 16 determines whether a pedestrian is present in the input image 20c based on the integrated image 45c (step S4). More specifically, the determiner 16 performs labeling on the integrated image 45 and then identifies areas of the integrated image 45 that have pixels with values equal to or larger than a reference value. If the identified areas include an area larger than a predetermined size (candidate area), the determiner 16 determines that a pedestrian is present in the candidate area. Based on the location of the candidate area, the determiner 16 draws a frame indicating the location of the pedestrian in the input image 20c and outputs the input image 20c with the frame, i.e. a detection result image 30.

As shown in FIG. 10, in the integrated image 45c, the areas with bright pixels are highlighted compared with the bright areas in the classification images 41a to 41c. As such, using the integrated image 45c, the determiner 16 can accurately determine the presence of a pedestrian in the input image 20c.

Next, when the object detection apparatus 1 receives an input image 20d, it generates a classification image 41d corresponding to the input image 20d (step S1). The integrator 15 selects the classification images 41b and 41c corresponding to two past input images that have been received immediately before (the input images 20b and 20c) to be integrated (step S2). The integrator 15 integrates the classification images 41b to 41d to generate an integrated image 45d. Again, the determiner 16 determines whether a pedestrian is present in the input image 20d based on the integrated image 45d.

Thus, the object detection apparatus 1 generates a classification image 41 each time it receives an input image 20. The object detection apparatus 1 integrates a classification image 41 and the two past classification images corresponding to the two past input images received immediately before to generate an integrated image 45. As the object detection apparatus 1 determines the presence of a pedestrian based on an integrated image 45, the detection accuracy for a pedestrian is improved over implementations where the presence of a pedestrian in the input image 20 is determined based on a classification image 41 only.

It is assumed that the input image 20c with a pedestrian has momentary noise such that the pixels in the area of the classification image 41 in which a pedestrian is actually present do not have a value indicative of the presence of a pedestrian. It is further assumed that the two immediately past input images (20a and 20b) show a pedestrian and, in the corresponding past classification images (the classification images 41a and 41b), the pixels in the area in which the pedestrian is present have a value that indicates the presence of a pedestrian. Then, the integrated image 45 is affected by the past classification images such that an integrated value of a pixel in an area in which a pedestrian is actually present is likely to exceed a reference value. As such, the object detection apparatus 1 can determine that a pedestrian is present in the input image 20c, preventing a false detection where the apparatus determines that no pedestrian is present even though a pedestrian is present in the input image 20.

Conversely, it is assumed that the pixels in an area of the classification image 41c have values indicative of the presence of a pedestrian even though no pedestrian is present in the input image 20c. It is further assumed that the two immediately past input images (20a and 20b) show no pedestrian and, in the corresponding past classification images (the classification images 41a and 41b), the pixels corresponding to those in the above area do not have a value that indicates the presence of a pedestrian. Then, the integrated image 45 is affected by the past classification images such that an integrated pixel value is likely to be below a reference value. As such, the object detection apparatus 1 prevents a false detection even when the classification image 41c has a classification value indicative of the presence of a person.

It is desirable that the integrator 15, before generating the integrated image 45, performs rounding-down of pixel values and weighting on the classification images 41a to 41d.

Rounding-down means comparing the value of each pixel of the classification images 41a to 41d with a predetermined threshold and rounding a pixel value that is below the threshold down to zero. For example, it is assumed that, in the classification images 41a to 41d, a pixel at a location where no pedestrian is present does not have a value sufficient to indicate the presence of a pedestrian. However, if values of this pixel were integrated without modifications, the integrated pixel value might be large enough to indicate the presence of a pedestrian, leading to a false detection. To address this problem, the value of the pixel at a location where no pedestrian is present may be rounded down to zero in advance to prevent a false detection due to integration of pixel values.

Weighting means associating a weighting factor dependent on when an input image 20 is received with a classification image to be integrated. For example, a classification image 41c may be generated and classification images 41a and 41b may be selected to be integrated. In this case, the integrator 15 associates the weighting factor of "1" with the classification image 41c. The integrator 15 associates a weighting factor of "a" that is smaller than 1 with the classification image 41b. The integrator 15 associates a weighting factor of "b" that is smaller than the weighting factor of "a" with the classification image 41a. Then, the integrator 15 uses these weighting factors to weight the values of the pixels of the classification images 41a to 41c and sum the results to generate an integrated image 45c.

That is, the integrator 15 associates a smaller weighting factor with a past classification image 42 that is distant in time from the present. The past classification image 42 reflects the presence of a pedestrian who is in the current input image 20 to a smaller degree. Thus, weighting factors may be associated with past classification images 42 when the classification image 41 and past classification images 42 are integrated to prevent a false detection.

Thus, the object detection apparatus 1 integrates a classification image 41 and past classification images 42 generated from input images 20 to generate an integrated image 45 and, based on the integrated image 45, determines whether a detection target is present in the input images 20. As the presence of a pedestrian in an input image 20 is determined while taking past classifications into consideration, a pedestrian in the input image 20 may be detected with improved accuracy.

[Variations]

In the above embodiment, the integrator 15 selects, for integration, past classification images 42 generated from two input images 20 received immediately before; however, the present embodiment is not limited to such a process. Only a past classification image 42 generated from one past input image received immediately before may be selected for integration. Still alternatively, past classification images 42 generated from three or more past input images received immediately before may be selected for integration. That is, the object detection apparatus 1 may select, for integration, one or more past classification images generated from one or more past input images received immediately before.

In the classification image generation (step S1) of the above embodiment, a scaled-up window image 22 and rotated window image 23 are generated and classification values 32 and 33 are generated from these window images; however, the present embodiment is not limited to such a process. The object detection apparatus 1 may only use a classification value 31 generated from a normal window image 21 to generate a classification image 41. Alternatively, either a scaled-up window image 22 or rotated window image 23 may be generated to calculate a classification value.

The object detection apparatus 1 may perform, in addition to scale-up and rotation, a predetermined type of image processing on an input image 20 to generate a modified window image. For example, scale-down, trapezoid conversion, X-axis inversion, Y-axis inversion, histogram transformation or the like may be performed on an input image 30. Histogram transformation means intentionally changing the average, distribution or the like of the values of the pixels of an input image 20 to change the distribution of the values of the pixels of the input image 20. X-axis inversion means inverting pixels with respect to the horizontal axis passing through the center of the input image 20. Y-axis inversion means inverting pixels with respect to the vertical axis passing the center of the input image 20.

In the above embodiment, if the object detection apparatus 1 fails to select two past classification images 42, it waits until it receives a next input image; however, the present embodiment is not limited to such a process. For example, when the object detection apparatus 1 receives an input image 20a, it may use the classification image 41a only to determine the presence of a pedestrian in the input image 20a.

Second Embodiment

[1. Configuration of Object Detection Apparatus 5]

Figure 11:
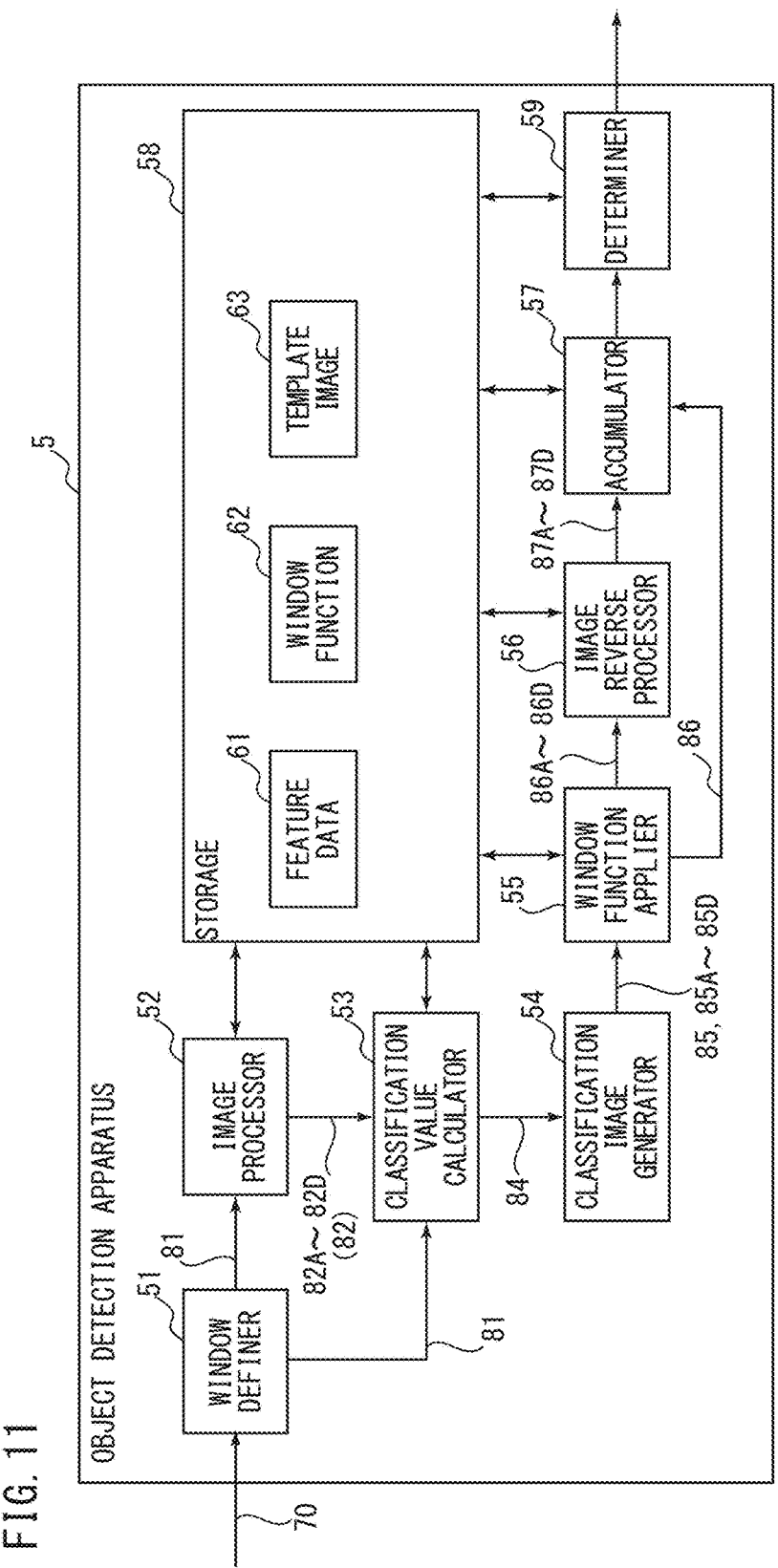
FIG. 11 is a functional block diagram of an object detection apparatus according to a second embodiment of the present invention.

FIG. 11 is a functional block diagram of an object detection apparatus 5 according to an embodiment of the present invention. The object detection apparatus 5 determines whether a detection target is present in an image captured by a camera (not shown). In the present embodiment, the object detection apparatus 5 is, together with the camera, mounted on a vehicle. Based on the image captured by the camera, the object detection apparatus 5 detects a pedestrian, i.e. a detection target.

As shown in FIG. 11, the object detection apparatus 5 includes a window definer 51, an image processor 52, a classification value calculator 53, a classification image generator 54, a window function applier 55, an image reverse processor 56, an accumulator 57, a storage 58, and a determiner 59.

The window definer 51 defines a window in an input image 70 received by the object detection apparatus 5 from the camera. The camera takes pictures of a scene in front of the vehicle to generate moving image data. The input image 70 corresponds to one of the frames that constitute the moving image data. The window is a unit area used to determine whether a pedestrian is present in the input image 70. The window definer 51 cuts out the image contained in the defined window from the input image 70 to generate a normal window image 81.

The image processor 52 performs a predetermined type of image processing such as scale-up, scale-down, rotation and pixel shifting on the input image 70. Further, the image processor 52 cuts out a window from the input image that has undergone the predetermined type of image processing to generate a scaled-up window image 82A, scaled-down window image 82B, rotated window image 82C, and shift window image 82D, corresponding to the types of image processing. The scaled-up window image 82A, scaled-down window image 82B, rotated window image 82C, and shift window image 82D may be collectively referred to as "modified window images 82". Modified window images 82 will be described in detail further below.

Based on the feature data 61 stored in the storage 58, the classification value calculator 53 calculates classification values 84 from the normal window image 81 and modified window images 82. The classification values 84 may be calculated using a neural network. A classification value 84 indicates the likelihood that a pedestrian is present in a window image. A classification value 84 increases as the possibility of the presence of a person in the window image increases, and approaches zero as the possibility of the presence of a person decreases.

The classification image generator 54 generates a normal classification image 85 having the size of a window from the classification value 84 from the normal window image 81, and generates modified classification images 85A to 85D having the size of a window from the classification values 84 from the modified window images 82. The classification image is a homogeneous image with all of its pixels having one classification value 84.

The window function applier 55 applies a window function 62 to the normal classification image 85 to generate a window function image 86, and applies the window function 62 to the modified classification images 85A to 85D to generate window function images 86A to 86D, respectively. In the present embodiment, a Gaussian window is used as the window function 62. Applying the window function 62 to the classification images varies the distribution of image values.

The image reverse processor 56 performs, on each of the window function images 86A to 86D, the type of image processing that is the reverse of the corresponding one of the types of image processing performed by the image processor 52 to generate reverse processed images 87A to 87D corresponding to the window function images 86A to 86D. For example, since the window function image 86A is created based on the scaled-up window image 82A, it is scaled down by the image reverse processor 56.

The accumulator 57 accumulates the values of the pixels of the window function image 86 and the values of the pixels of the reverse processed images 87A to 87D depending on the window location. More specifically, the accumulator 57 maps the window function image 86 and reverse processed images 87A to 87D to a template image 63. All the pixels of the template image 63 have a value of zero, and its size is equal to that of the input image 70.

Based on the template image 63 after the mapping, the determiner 59 determines whether a pedestrian is present in the input image 70.

The storage 58 may be a hard disc drive or flash memory, and may hold the feature data 61, window function 62 and template image 63. The feature data 61 represents the features of detection targets (pedestrians). The window function 62 is data that describes a Gaussian window. The storage 58 may also be used as a work area used by the window definer 51, image processor 52, classification value calculator 53, classification image generator 54, window function applier 55, image reverse processor 56, integrator 57, and determiner 59 to perform various processes.

[2. Operation of Object Detection Apparatus 5]

Figure 12:
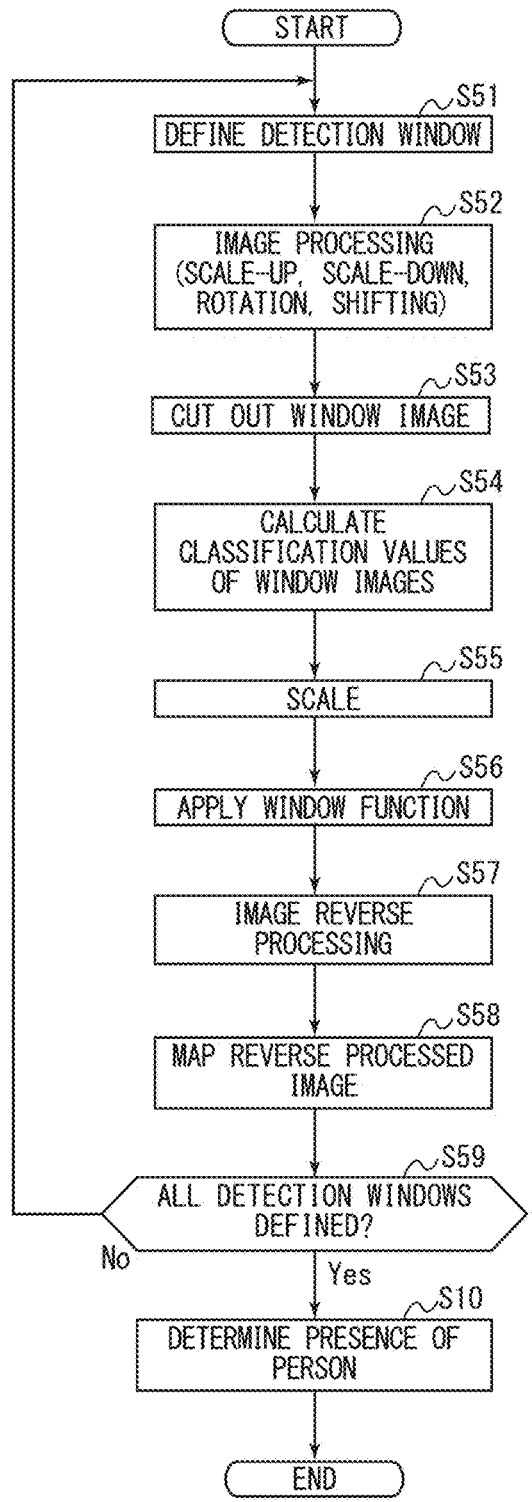
FIG. 12 is a flow chart illustrating the operation of the object detection apparatus shown in FIG. 11.
Figure 13:
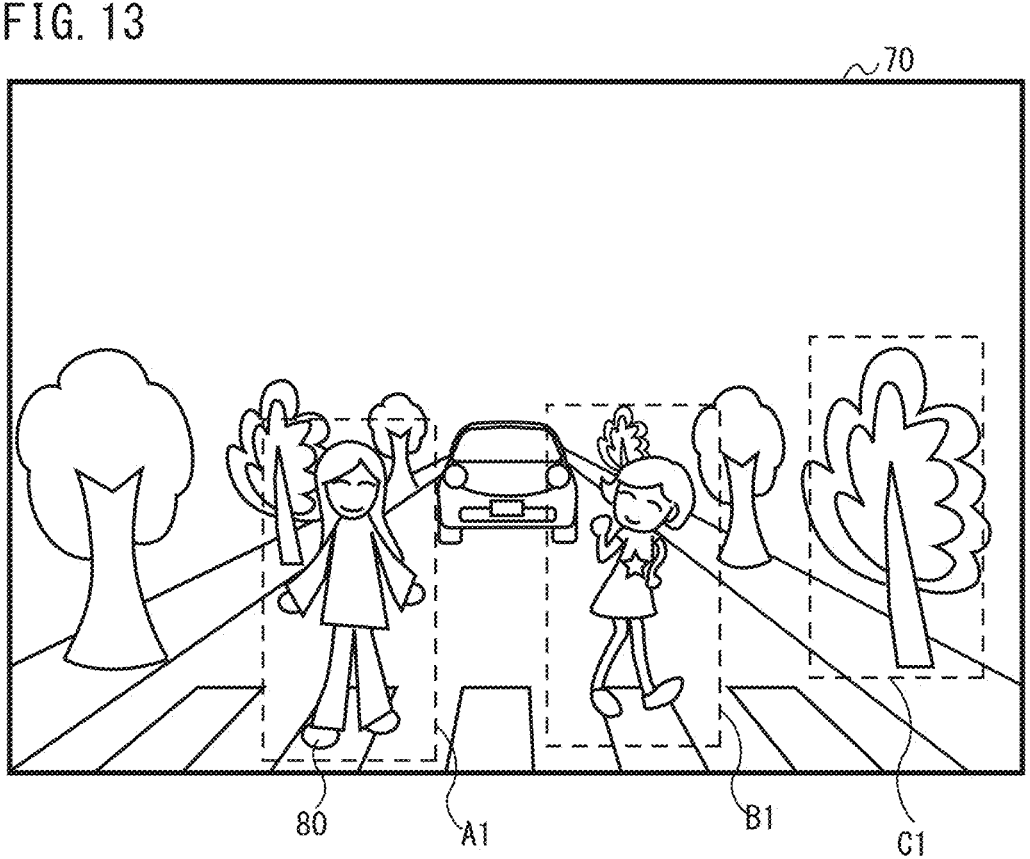
FIG. 13 illustrates an example of an input image received by the object detection apparatus shown in FIG. 11.

The FIG. 12 is a flow chart indicating the operation of the object detection apparatus 5. FIG. 13 illustrates an example of an input image 70. The operation of the object detection apparatus 5 will be described with reference to FIGS. 12 and 13.

Each time the object detection apparatus 5 receives a frame (i.e. an input image 70) from the camera, it performs the process shown in FIG. 12 on the frame. The window definer 51 defines a window in the input image 70 in a predetermined order (step S51). As discussed further below, step S51 is performed several times. Thus, similar to the first embodiment, windows are defined in such a way that the input image 70 is scanned beginning with the top-left apex and ending with the bottom-right apex.

Next, the operation of the object detection apparatus 5 will be described with reference to an example where the window A1 shown in FIG. 13 is defined at step S51, unless specifically indicated otherwise. A person 80 is present in the window A1.

The image processor 52 separately performs scale-up, scale-down, rotation and pixel shifting on the image pixel 70 (step S52). Thus, a plurality of modified window images 82 are generated corresponding to the types of image processing. The scale-up and scale-down are performed with respect to the center of the window A1 (corresponding to the center 81P of the normal window image 81 shown in FIG. 14). The image processor 52 may perform image processing on only the window A1 and the surrounding area of the window A1. This will reduce computation at step S52. The surrounding area is defined such that a modified window image 82 may be generated without a blank area. The rotation means rotating the input image 70 clockwise with respect to the center of the window A1. The pixel shifting means each pixel of the input image 70 moving toward the bottom-left according to a predetermined amount of motion. It should be noted that the coordinates that define the window A1 remain unchanged at step S52.

Figure 14:
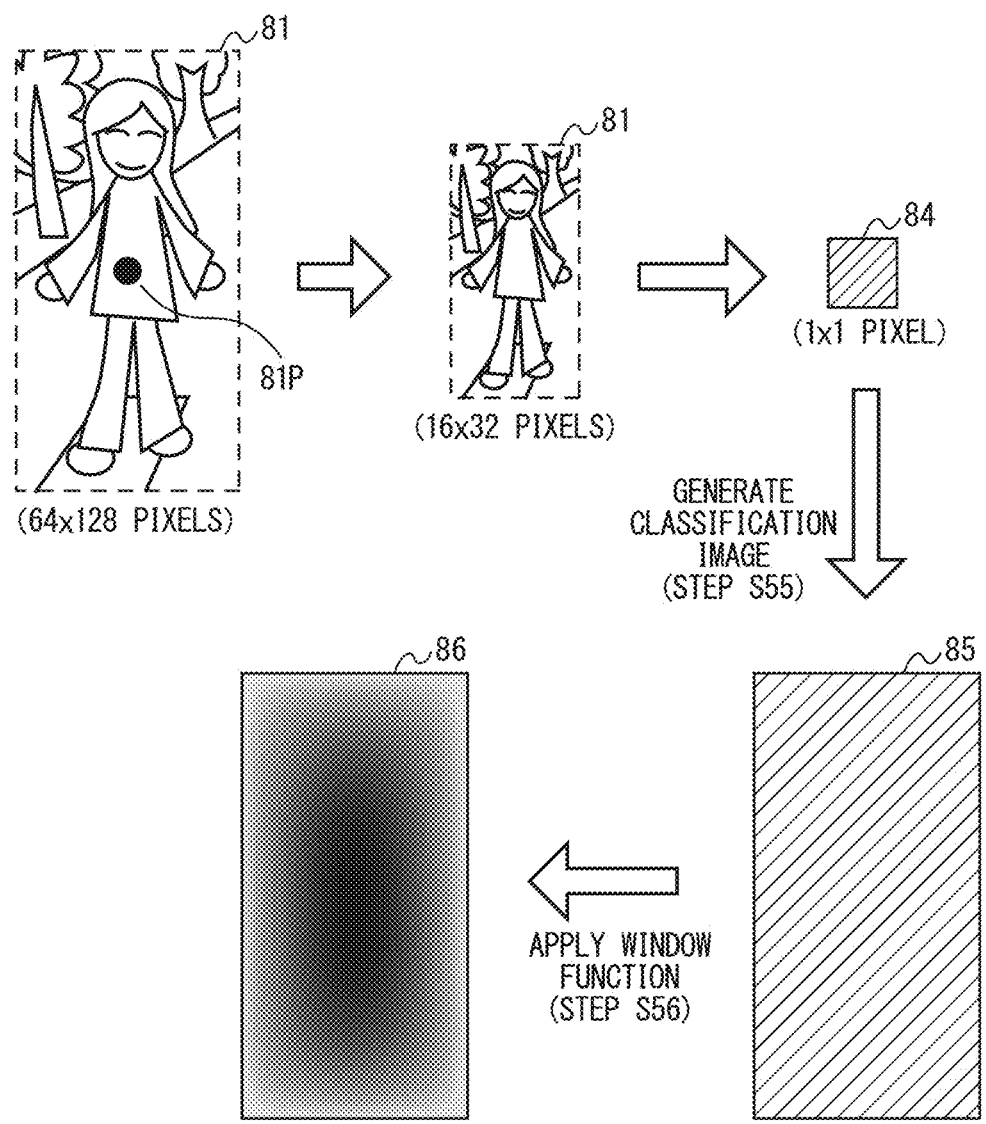
FIG. 14 illustrates how a normal window image cut out from the input image shown in FIG. 13 and a window function image corresponding to the normal window image are generated.

The object detection apparatus 5 performs cutting-out on the input image 70 and the input images 70 that have undergone the various types of image processing (step S53). More specifically, the window definer 51 cuts out an image contained in the window A1 from the input image 70 to generate a normal window image 81. FIG. 14 shows the normal window image 81.

Figure 15:
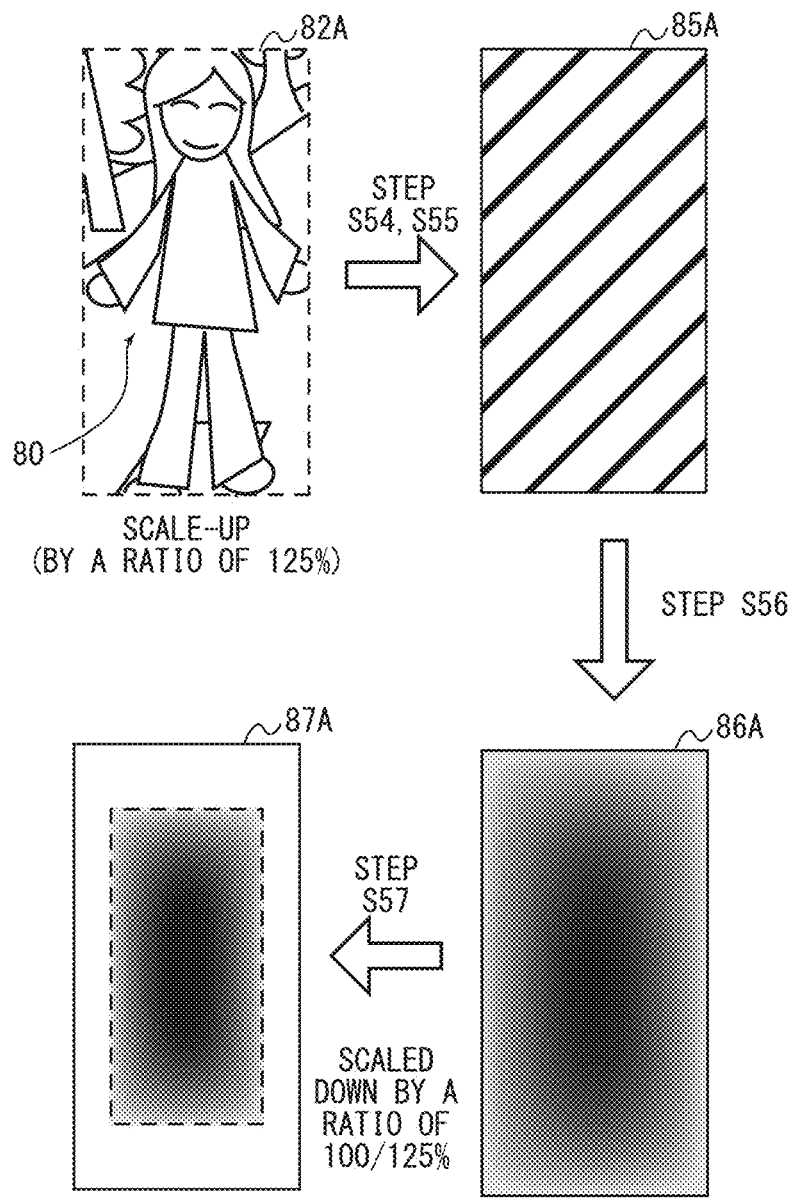
FIG. 15 illustrates an example of how an image is modified, starting with the image processing (step S53) shown in FIG. 12 and ending with the image reverse processing (step S57).

Further, the image processor 52 cuts out an image contained in the window A1 from the scaled-up input image 70 to provide a scaled-up window image 82A (see FIG. 15). The image processor 52 cuts out an image contained in the window A1 from the scaled-down input image 70 to provide a scaled-down window image 82B (see FIG. 16). The image processor 52 cuts out an image contained in the window A1 from the rotated input image 70 to provide a rotated window image 82C (see FIG. 17). The image processor 52 cuts out an image contained in the window A1 from a pixel-shifted input image 70 to provide a shifted window image 82D (see FIG. 18).

Even when a person is imaged in the normal window image 81, the classification value calculator 53 may fail to output a sufficiently large classification value to indicate that a person may be present, due to noise or the like. However, if the features of a person imaged in one of the modified window images 82 are consistent with the features stored in the feature data 61, the classification value calculator 53 may output a classification value that is sufficiently large to indicate the presence of a person. In view of this, the object detection apparatus 5 generates, in addition to the normal window image 81, a modified window image 82 that is to be used by the neural network for calculation in order to increase the detection accuracy for a person.

It should be noted that steps S52 and S53 may be switched in order. More specifically, the window definer 51 cuts out a normal window image 81 from an input image 70 (step S53). Thereafter, the image processor 52 separately performs various types of image processing, such as scale-up, on the normal window image 81 (step S53). Thus, the scaled-down window image 82B, rotated window image 82C and shifted window image 82D each have a blank area. The values of the pixels in blank areas may remain zero. Alternatively, similar to the first embodiment, the apparatus may copy the values of the pixels in the area other than the blank area into the pixels in the blank area.

Based on the feature data 61, the classification value calculator 53 calculates classification values for the normal window image 81 and modified window images 82 (step S54). The classification values may be calculated using, other than a neural network, various algorithms such as pattern matching and a support vector machine.

FIG. 14 illustrates how a window function image 86 may be generated. It is assumed that the normal window image 81 has a horizontal size of 64 pixels and a vertical size of 128 pixels. Then, the classification value calculator 53 scales the normal window image 81 down to an image of 16 horizontal pixels and 32 vertical pixels, and uses the scaled-down normal window image 81 to calculate a classification value 84. Scaling-down the normal window image 81 reduces computation by the neural network. The classification value 84 is treated as an image of 1 vertical pixel and 1 horizontal pixel. That is, the classification value 84 serves as the value of this pixel. The classification values 84 corresponding to the modified window images 82 are calculated in a similar manner.

Next, the classification image generator 54 converts in scale the classification value 84 to the size of the window A1 to generate a normal classification image 85 (step S55). As shown in FIG. 14, an image of 1×1 pixel is scaled to an image of 64 horizontal pixels and 128 vertical pixels to generate a normal classification image 85. Since all the pixels of the normal classification image 85 are set to the classification value 84, the normal classification image 85 is a homogeneous image without a change. As shown in FIGS. 15 to 18, modified classification images 85A to 85D corresponding to the modified window images 82 are generated in an analogous manner.

The window function applier 55 multiplies the normal classification images 85 and modified classification images 85A to 85D by the window function 62 (step S56). The window function 62 may be a Gaussian window or various other window functions such as a Hamming window. This generates a window function images 86 corresponding to the normal classification image 85 (see FIG. 14), and window function images 86A to 86D corresponding to the modified classification images 85A to 85D (see FIGS. 15 to 18).

As shown in FIGS. 14 to 18, application of the window function 62 converts the normal classification image 85 and modified classification images 85A to 85D, which are homogenous images, to images with pixels with smaller values as it goes outwardly. In the normal classification image 85 and modified classification images 85A to 85D, areas with pixels with larger values are darker, while areas with pixels with smaller values are brighter. The same applies to the reverse processed images 87A to 87D, described further below (see FIGS. 15 to 18).

The image reverse processor 56 performs, on each of the window function images 86A to 86D, the type of image processing that is the reverse of the type of image processing used to generate the corresponding modified window image 82 (step S57). This generates reverse processed images 87A to 87D corresponding to the modified window images 82, as shown in FIGS. 15 to 18. Details of step S57 and the reason why step S57 is performed will be described further below. The window function image 86, which corresponds to the normal window image 81, is not processed at step S57.

The accumulator 57 maps the window function image 86 and reverse processed images 87A to 87D to the template image 63 (step S58). That is, the accumulator 57 accumulates, on a pixel-by-pixel basis, the values of the pixels of the window function image 86 and reverse processed images 87A to 87D. The accumulator 57 adds the accumulated pixel values to the values of those of the pixels of the template image 63 that are in the window A1.

If not all the windows have been defined (No at step S59), the object detection apparatus 5 returns to step S51. As a result, the normal window image 81 and reverse processed images 87A to 87D for each window defined are mapped to the template image 63.

If all the windows have been defined (Yes at step S59), the determiner 59 determines whether a person is imaged in the input image 70 based on the template image 63 where the values of the pixels of the window function image 86 and that values of the pixels of the reverse processed images 87A to 87D of each window are accumulated according to the pixel location (hereinafter referred to as "accumulated image") (step S60). That is, the accumulated image is generated by accumulating the values of the pixels of the window function image 86 and the values of the pixels of the reverse processed images 87A to 87D of each window according to the pixel location in the input image 70.

More specifically, the object detection apparatus 5 compares the value of each pixel of an accumulated image with a predetermined threshold to determine whether there is a candidate area, which has a pixel with a value exceeding the threshold. If there is a candidate area, the object detection apparatus 5 determines that a pedestrian is present in the input image 70. At this time, the object detection apparatus 5 may consider the candidate area as the location of the pedestrian. If the object detection apparatus 5 fails to identify a candidate area, it determines that no pedestrian is present in the input image 70. Similar to the first embodiment, the object detection apparatus 5 may performing labeling to identify a candidate area. That is, the object detection apparatus 5 may identify an area of an accumulated image that includes a pixel with a value equal to or larger than a reference value and consider those of such areas that are larger than a predetermined size as candidate areas.

Figure 19:
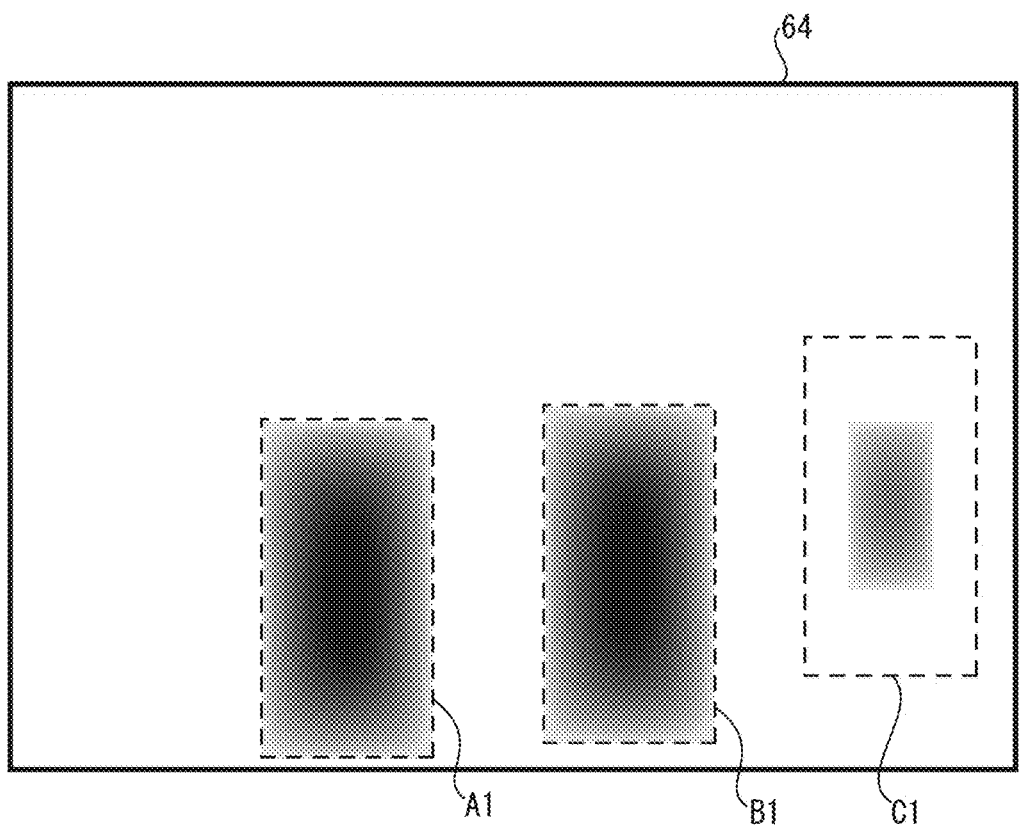
FIG. 19 illustrates examples of the results of mapping of an image generated by the image reverse processing (step S56) shown in FIG. 12.

FIG. 19 illustrates an example of an accumulated image. In the accumulated image 64 shown in FIG. 19, shading represents the likelihood of the presence of a person. As an area becomes darker, the likelihood of the presence of a person increases. The windows A1 to C1 shown in FIG. 19 correspond to the windows A1 to C1 shown in FIG. 13. In the window C1 shown in FIG. 13, a tree is present but no person is present. However, the area C1 of the accumulated image 64 is gray, which suggests the presence of a person. This indicates that at least one of the classification values 84 calculated from the normal window image 81 and modified window images 82 for the area C1 has a large value, indicative of the presence of a person. However, the window C1 is lighter than the windows A1 and B1, which means that the values of the pixels of the window C1 may be smaller than a threshold. In view of this, the object detection apparatus 5 considers the windows A1 and B1 as candidate areas and does not consider the area C1 as a candidate area.

Thus, the object detection apparatus 5 integrates the distribution of the classification values for a person derived from the normal window image 81 and the distributions of the classification values for a person derived from the modified window images 82. In this way, even if a pedestrian is falsely detected in one of the window images, the false detection of a pedestrian is prevented from being output as a final detection result.

[3. Correspondences Between Modified Window Images and Reverse Processed Images]

The relationship between modified window images and reverse processed images will now be described, where the types of image processing at step S52 (scale-up, scale-down, rotation and pixel shifting) will be separately discussed.

[3.1. Scaled-Up Window Image 82A and Reverse Processed Image 87A]

FIG. 15 illustrates how an image is modified until a reverse processed image 87A is generated. A scaled-up window image 82A is generated after an input image 70 is scaled up (steps S52 and S53). A reverse processed image 87A is generated by scaling down a window function image 86A, which corresponds to the scaled-up window image 82A (step S57).

The image processor 52 changes the size of an input image 70 by a ratio of 125(%) (step S52) and cuts out an area of the scaled-up input image 70 that fits with the window A1 to generate a scaled-up window image 82A (step S53). Here, the image processor 52 scales up the input image 70 relative to the center of the window A1.

In implementations where steps S52 and S53 are performed in the reversed order, the normal window image 81 may be scaled up relative to the center 41P (see FIG. 14). The same applies to implementations where step S53 is performed first to generate a scaled-down window image 82B and a rotated window image 82C. Implementations with a shift window image 82D will be described further below.

The classification value calculator 53 calculates a classification value 84 from the scaled-up window image 82A (step S54), and the classification image generator 54 generates a modified classification image 85A from the calculated classification value 84 (step S55). Similar to the normal classification image 85, the modified classification image 85A is a homogeneous image. A window function image 86A is generated from the modified classification image 85A (step S56).

Since the scaled-up window image 82A is generated after the input image 70 is scaled up, the image reverse processor 56 scales down the window function image 86A to generate a reverse processed image 87A (step S57). Since the ratio of 125(%) is used at step S52, the window function image 86A is scaled down by a ratio of 100/125(%). The image is scaled down relative to the center of the window function image 86A. As shown in FIG. 15, the window function image 86A is scaled down to form the image defined by broken lines in the reverse processed image 87A. The pixels in the portion of the reverse processed image 87A that is outside the broken lines are padded as invalid data. Alternatively, these pixels may be set to zero.

The reason why the window function image 86A is to be scaled down at step S57 will be described. As discussed above, the scaled-up window image 82A is generated after the input image 70 is scaled up such that the area covered by the scaled-up window image 82A is smaller than the area covered by the window A1 (see FIG. 13) of the input image 70. That is, the window function image 86A reflects the results of calculation by the neural network for an area smaller than the area covered by the window A1 of the input image 70. To align the area covered by the window function image 86A with the actual area that it would cover in the input image 70, the image reverse processor 56 scales down the window function image 86A, a process that is the reverse of the scaling-up at step S52. Thus, the classification values from the scaled-up window image 82A may be returned to the locations that correspond to those within the actual area covered by the scaled-up window image 82A, thereby improving the detection accuracy.

[3.2. Scaled-Down Window Image 82B and Reverse Processed Image 87B]

Figure 16:
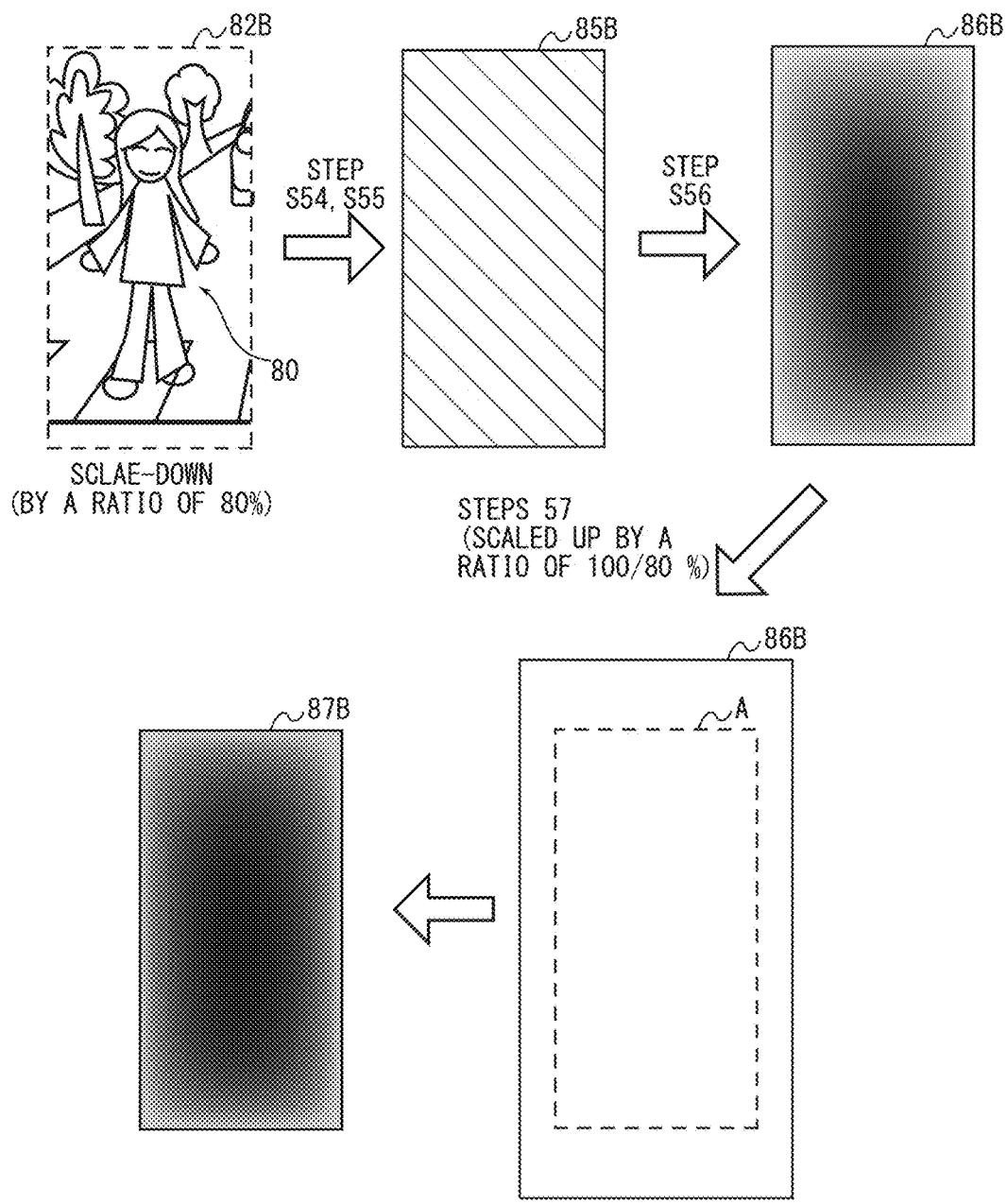
FIG. 16 illustrates another example of how an image is modified, starting with the image processing (step S53) shown in FIG. 12 and ending with the image reverse processing (step S57).

FIG. 16 illustrates how an image is modified until a reverse processed image 87B is generated. A scaled-down window image 82B is generated after an input image 70 is scaled down (steps S52 and S53). A reverse processed image 87B is generated after a window function image 86B, which corresponds to the scaled-down window image 82B, is scaled up.

The image processor 52 changes the size of the input image 70 by a ratio of 80(%) (step S52), and cuts out a window A1 from the scaled-down input image 70 to generate a scaled-down window image 82B (step S53). The size is changed relative to the center of the window A1.

The classification value calculator 53 calculates a classification value 84 from the scaled-down window image 82B (step S54), and the classification image generator 54 generates, from the calculated classification value 84, a homogeneous modified classification image 85B (step S55). A window function image 86B is generated from the modified classification image 85B (step S56).

Since the scaled-down window image 82B is generated after the input image 70 is scaled down, the image reverse processor 56 scales up the window function image 86B and generates a reverse processed image 87B (step S57). Since the ratio of 80(%) is used at step S52, the window function image 86B is scaled up by a ratio of 100/80(%). The image is scaled up relative to the center of the window function image 86B.

As shown in FIG. 16 to the bottom right, the size of the scaled-up window function image 86B is larger than that of the window A1. In the scaled-up window function image 86B, no shading for representing the pixel values is shown. To align the scaled-up window function image 86B with the window A1 in the input image 70, the image reverse processor 56 cuts out an area with the same size as that of the window A1 from the scaled-up window function image 86B, relative to the center of the scaled-up window function image 86B. That is, the image reverse processor 56 performs, on the modified classification image, the type of image processing that is the reverse of the type of image processing performed by the image processor; then, the image reverse processor 56 cuts out an area with the same size as that of the window A1 from the image that has undergone reverse image processing, relative to the center of the modified classification image that has undergone reverse image processing, thereby generating a reverse processed image. Thus, a reverse processed image 87B having the same size as that of the window A1 and corresponding to the scaled-down window image 82B is generated.

[3.3. Rotated Window Image 82C and Reverse Processed Image 87C]

Figure 17:
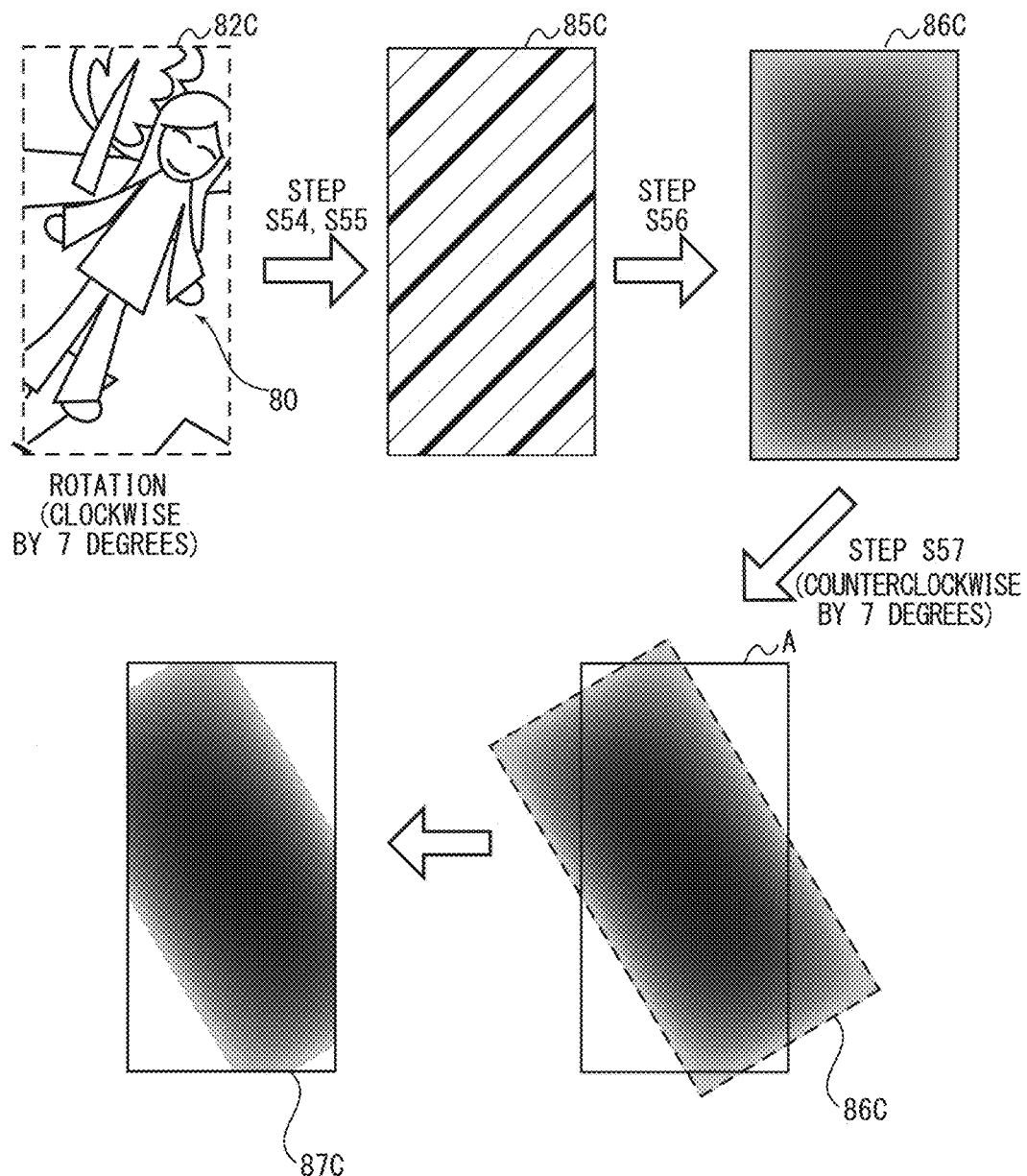
FIG. 17 illustrates yet another example of how an image is modified, starting with the image processing (step S53) shown in FIG. 12 and ending with the image reverse processing (step S57).

FIG. 17 illustrates how an image is modified until a reverse processed image 87C is generated. A rotated window image 82C is generated after the input image 70 is rotated clockwise (steps S52 and S53). The reverse processed image 87C is generated by rotating a window function image 86C corresponding to the rotated window image 82C counterclockwise (step S57).

The image processor 52 rotates the input image 70 clockwise by 7 degrees (step S52), and cuts out a window A1 from the rotated input image 70 to generate a rotated window image 82C (step S53). The input image 70 is rotated with respect to the center of the window A1. In FIG. 17, the rotational angle of the rotated window image 82C is exaggerated to clarify the difference between the normal window image 81 and rotated window image 82C.

The classification value calculator 53 calculates a classification value 84 from the rotated window image 82C (step S54), and the classification image generator 54 generates from the calculated classification value 84 a homogeneous modified classification image 85C (step S55). A window function image 86C is generated from the modified classification image 85C (step S56).

Since the rotated window image 82C is generated after the input image 70 is rotated clockwise, the image reverse processor 56 rotates the window function image 86C counterclockwise and generates a reverse processed image 87C (step S57). The rotational angle is the same as the rotational angle at step S52 (i.e. 7 degrees). The image is rotated with respect to the center of the window function image 86C.

As shown in FIG. 17 to the bottom right, some portions of the rotated window function image 86C are outside the window A1. In view of this, to align the rotated window function image 86C with the window A1 in the input image 70, the image reverse processor 56 cuts out an area of the rotated window function image 86C that fits with the window A1 and that shares the center with the rotated window function image 86C. Thus, a reverse processed image 87C aligned with the window A1 and corresponding to the rotated window image 82C is generated. The portions of the reverse processed image 87C that do not have a pixel of the rotated window function image 86C are padded with invalid data. Alternatively, these pixels may be set to a value of zero.

[3.4. Shift Window Image 82D and Reverse Processed Image 87D]

Figure 18:
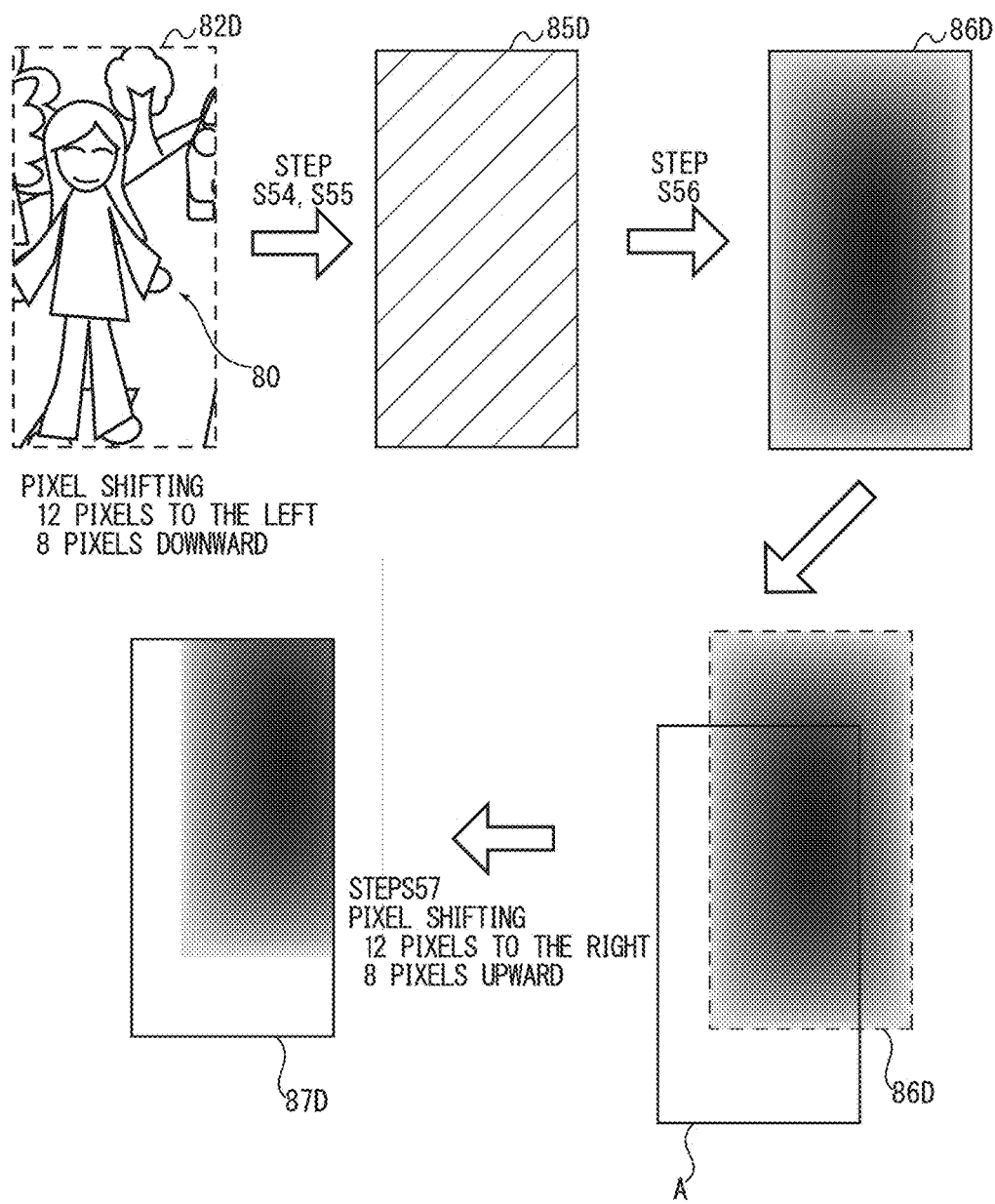
FIG. 18 illustrates still another example of how an image is modified, starting with the image processing (step S53) shown in FIG. 12 and ending with the image reverse processing (step S57).

FIG. 18 illustrates how an image is modified until a reverse processed image 87D is generated. A shift window image 82D is generated after the pixels of the normal window image 81 are moved (i.e. shifted) (steps S52 and S53). The reverse processed image 87D is generated after the pixels of a window function image 86D corresponding to the shift window image 82D, which have been moved at step S52, are returned to their original locations (step S57).

The image processor 52 moves the pixels of the input image 70 12 pixels to the left and 8 pixel downward (step S52) and cuts out a window A1 from the input image 70 with their pixels shifted to generate the shift window image 82D (step S53). In FIG. 18, the amount of movement of the person 80 is exaggerated to clarify the difference between the normal window image 81 and shift window image 82D.

The classification value calculator 53 calculates a classification value 84 from the shift window image 82D (step S54), and the classification image generator 54 generates from the calculated classification value 84 a homogeneous modified classification image 85D (step S55). The window function image 86D is generated from the modified classification image 85D (step S56).

Since the shift window image 82D is generated after the pixels of the input image 70 are shifted, the image reverse processor 56 moves the pixels of the window function image 86D 12 pixels to the right and 8 pixels upward (step S57). As shown in FIG. 18 to the bottom right, as the pixels are moved at step S57, some portions of the pixel-shifted window function image 86C are outside the window A1. To align the pixel-shifted window function image 86D with the window A1 in the input image 70, the image reverse processor 56 cuts out an area of the pixel-shifted window function image 86D that fits with the window A1. Thus, a reverse processed image 87D aligned with the window A1 and corresponding to the shift window image 82D is generated. The portions of the reverse processed image 87D that do not have a pixel of the pixel-shifted window function image 86D are padded with invalid data. Alternatively, these pixels may be set to a value of zero.

Thus, each of the window function images 86A to 86D may undergo the type of image processing that is the reverse of the corresponding one at step S52 such that the window function images 86A to 86D represent the actual areas of the modified window images 82. As such, the values of the pixels of the portions of the window function images 86A to 86D that are not aligned with the window A1 are not accumulated, thereby preventing the unaligned portions from affecting the determination as to whether a person is present.

[3.5. Other Processes]

The image processor 52 may generate a modified window image from a normal window image 81 using methods other than the above four (i.e. scale-up, scale-down, rotation and pixel shifting). For example, image processing may be trapezoid conversion, X coordinate conversion or Y coordinate conversion. X coordinate conversion means inverting the pixels of a normal window image 81 with respect to the vertical axis passing through the center 81P of the normal window image 81. Y coordinate conversion means inverting the pixels of a normal window image 81 with respect to the horizontal axis passing the center 81P. When a modified window image is generated using trapezoid conversion, X coordinate conversion or Y coordinate conversion at step S52, the image reverse processor 56 may perform, on the window function image corresponding to that modified window image, the type of image processing that is the reverse of the type of image processing used to generate that modified window image.

For image processing, the image processor 52 may also add noise to an input image 70, or perform histogram transformation or shading reversing. Histogram transformation means changing the average, variance or the like of the values of the pixels of an input image 70 to intentionally change the distribution of the values of the pixels of the input image 70. In implementations where such image processing generates a modified window image, the image reverse processing (step S57) is not performed because the area of a modified window image generated by noise addition, histogram transformation or shading reversing is already aligned with the window.

Further, the image processor 52 may combine a plurality of types of image processing to generate a modified window image. For example, a normal window image 81 may be scaled up and rotated to generate a modified window image. In such implementations, at step S57, the window function image corresponding to that modified window image is scaled down and rotated in the opposite direction.

Thus, the object detection apparatus 5 performs a plurality of types of image processing on a normal window image 81 to generate modified window images 82, and generates window function images 86 and 86A to 86D based on the classification values 84 from those window images. Each of the window function images 86A to 86D undergoes the type of image processing that is the reverse of the corresponding one of the above types of image processing to generate reverse processed images 87A to 87D. The window function image 86 and reverse processed images 87A to 87D are mapped to generate to accumulated image 64, based on the accumulated image 64, the object detection apparatus 5 determines whether a person is present in the input image 70.

Thus, even when a false detection occurs in a normal window image 81 or modified window image 82, the present or absence of a person in the input image 70 may be determined based on the accumulated image 64 to improve the detection accuracy for an object (pedestrian).

[Variations]

In the above embodiments, an implementation is described where four types of image processing are performed at step S52; however, the present invention is not limited to such an implementation. The object detection apparatus 5 may perform at least one type of image processing on a normal window image 81 at step S52 to generate a modified window image. Thus, the detection accuracy for a person in an input image 70 may be improved over implementations where classification values 84 are calculated only from normal window images 81.

In the above embodiments, an implementation is described where a scaled-up window image 82A and scaled-down window image 82B are generated by scaling a normal window image 81 by an identical vertical and horizontal ratio; however, the present invention is not limited to such an implementation. The vertical and horizontal ratios may be different from each other.

In the above embodiment, an implementation is described where a reverse processed image 87B is generated from a window function image 86B by cutting out a window A1 from a scaled-up window function image 87B; however, the present invention is not limited to such an implementation. The image reverse processor 56 may output the scaled-up window function image 86B as a reverse processed image 87B without modifications. If the scaled-up window function image 86B is to be mapped to a template image (step S58), the accumulator 57 may align the center of the scaled-up window function image 86B with the coordinates of the center 81P of the normal window image 81.

In the above embodiments, an implementation is described where a reverse processed image 87C is generated from a modified classification image 85C corresponding to a rotation window image 82C by generating a window function image 86C from the modified classification image 85C and rotating the window function image 86C counterclockwise; however, the present invention is not limited to such an implementation. The window function applier may use a window function 62 corresponding the reverse image processing to directly generate a reverse processed image 87C from a modified classification image 85C. More specifically, the window function applier 55 applies a window function 62 that has undergone a counterclockwise rotational conversion to a modified classification image 85C to generate a reverse processed image 87C.

Further, the above first and second embodiments may be combined. The accumulated image of the second embodiment may be used as the classification image for the first embodiment.

In the object detection apparatus 1 and 5 described in the above embodiments, each of the functional blocks may be separately implemented by one semiconductor device chip, such as an LSI, or some or all of them may be implemented by one chip. Further, such integrated circuits are not limited to LSIs, and may be implemented by devoted circuits or general-purpose processors. Field programmable gate arrays (FPGAs) that can be programmed after being fabricated or reconfigurable processors where connections or settings of circuit cells inside can be reconfigured may be used.

Some or all of the operations of the functional blocks of the above embodiments may be implemented by a program. In that case, some or all of the operations of the functional blocks of the above embodiments are executed by a central processing unit (CPU) in a computer. The program for executing these operations are stored in a storage such as a hard disk or ROM, and are executed on such a ROM, or are read by a RAM and executed thereon.

The operations of the above embodiments may be implemented by hardware, or by software (including implementations together with an operating system (OS), middleware or a predetermined library). The operations may be implemented by a combination of software and hardware. Of course, in implementations where the object detection apparatus according to the above embodiments are implemented by hardware, timing for the operations must be provided. In the above embodiments, for ease of explanation, timing for various signals in actual hardware designs are not described in detail.

While the invention has been shown and described in detail, the foregoing description is in all aspects illustrative and not restrictive. It is therefore understood that numerous modifications and variations can be devised without departing from the scope of the invention.

What is claimed is:

1. An object detection apparatus, comprising:
circuitry configured to
define a window in an input image, and extract the window from the input image to generate a normal window image;
perform a predetermined type of image processing on the normal window image to generate a modified window image;
calculate, based on feature data of a detection target, a normal classification value indicative of a likelihood that the detection target is present in the normal window image and a modified classification value indicative of a likelihood that the detection target is present in the modified window image;
generate, from the normal classification value, a normal classification image with the same size as the window and to generate, from the modified classification value, a modified classification image with the same size;
perform, on the modified classification image, a type of image processing that is a reverse of the predetermined type of image processing to generate a reverse processed image; and
accumulate values of pixels of normal classification images each obtained for one window and values of pixels of reverse processed images depending on a window location.

2. The object detection apparatus according to claim 1, wherein the circuitry is configured to:
apply a predetermined window function to the normal classification image and the reverse processed image and
accumulate values of pixels of normal classification images to which the predetermined window function has been applied and values of pixels of reverse processed images to which the predetermined window function has been applied.

3. The object detection apparatus according to claim 1, wherein
the circuitry is configured to apply a window function corresponding to the reverse type of image processing to the modified classification image to generate the reverse processed image.

4. The object detection apparatus according to claim 1, wherein the circuitry is configured to:
perform a first type of image processing on the normal window image to generate a first modified window image, and a second type of image processing on the normal window image to generate a second modified window image;
generate a first modified classification image based on a classification value derived from the first modified window image, and a second modified classification image based on a classification value derived from the second modified window image; and
perform a type of image processing that is a reverse of the first type of image processing on the first modified classification image, and a type of image processing that is a reverse of the second type of image processing on the second modified classification image.

5. The object detection apparatus according to claim 1, wherein the circuitry is configured to;
perform the predetermined type of image processing on the input image; and
cut out an image contained in the window from the input image that has undergone the predetermined type of image processing.

6. A non-transitory computer-readable recording medium storing an object detection program that causes a computer incorporated in an object detection apparatus to execute the steps of:
defining a window in an input image;
extracting the window from the input image to generate a normal window image;

performing a predetermined type of image processing on the normal window image contained in the window in the input image to generate a modified window image;

calculating, based on feature data of a detection target, a normal classification value indicative of a likelihood that the detection target is present in the normal window image and a modified classification value indicative of a likelihood that the detection target is present in the modified window image;

generating, from the normal classification value, a normal classification image with the same size as the window and to generate, from the modified classification value, a modified classification image with the same size;

performing, on the modified classification image, a type of image processing that is a reverse of the predetermined type of image processing to generate a reverse processed image; and accumulating the values of the pixels of normal classification images each obtained for one window and values of pixels of reverse processed images depending on a window location.

\* \* \* \* \*